Figure 10:
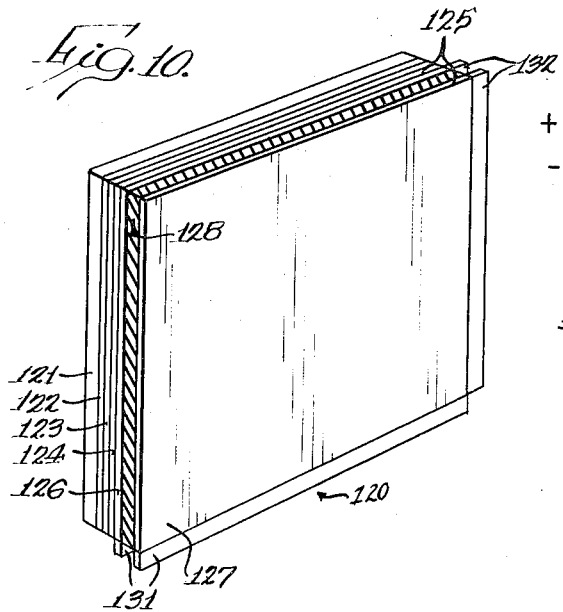

May 3, 1966
W. R. AIKEN
3,249,804
SYSTEM FOR EFFECTING SELECTIVE ENERGIZATION OF A DISPLAY
DEVICE WITH COINCIDENT WAVES
Filed Aug. 17, 1959
6 Sheets-Sheet 1
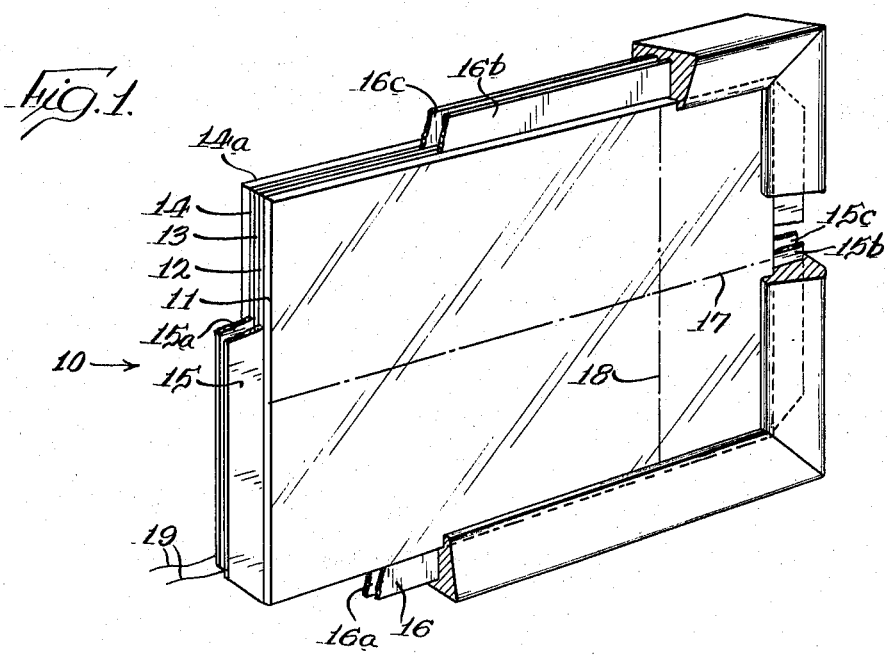
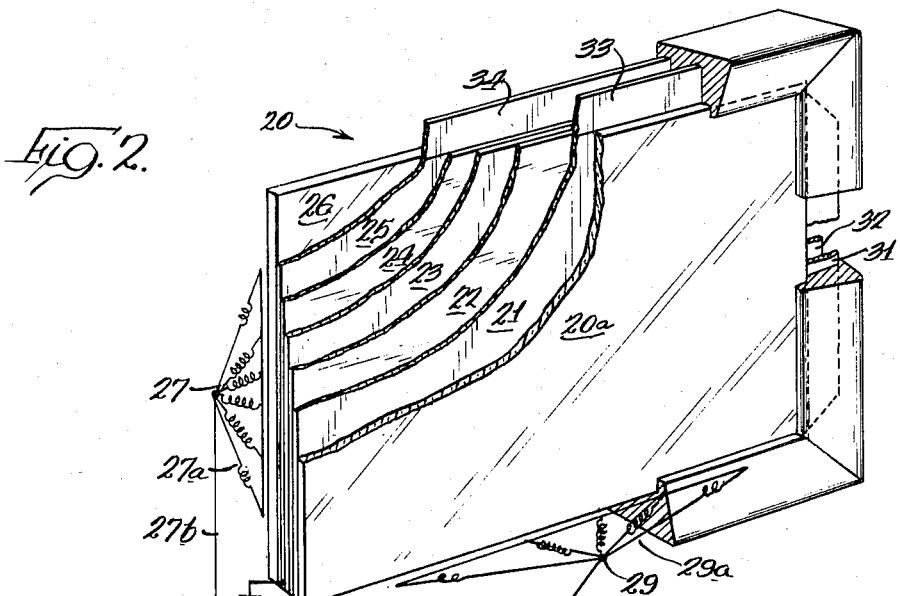
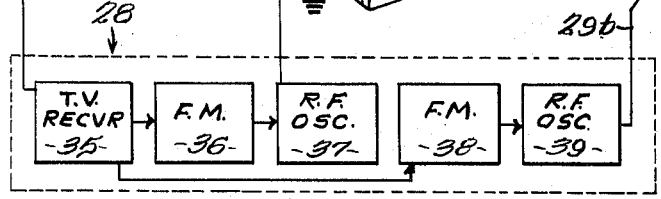
INVENTOR.
William R. Aiken
BY
Brown, Jackson, Boettcher & Dienner
Attys.

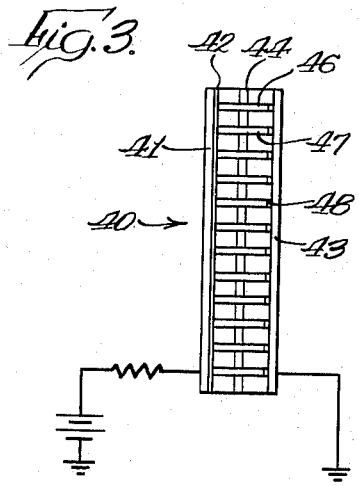
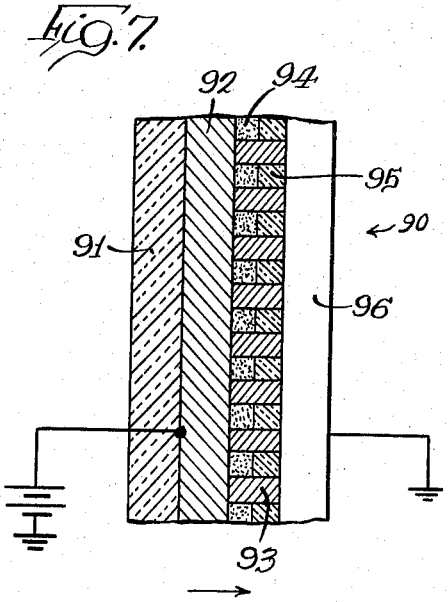
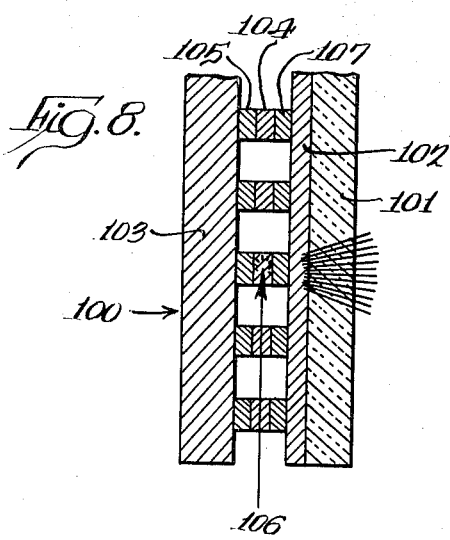
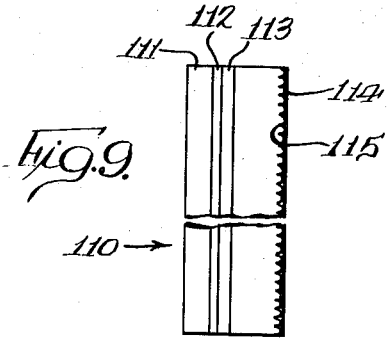

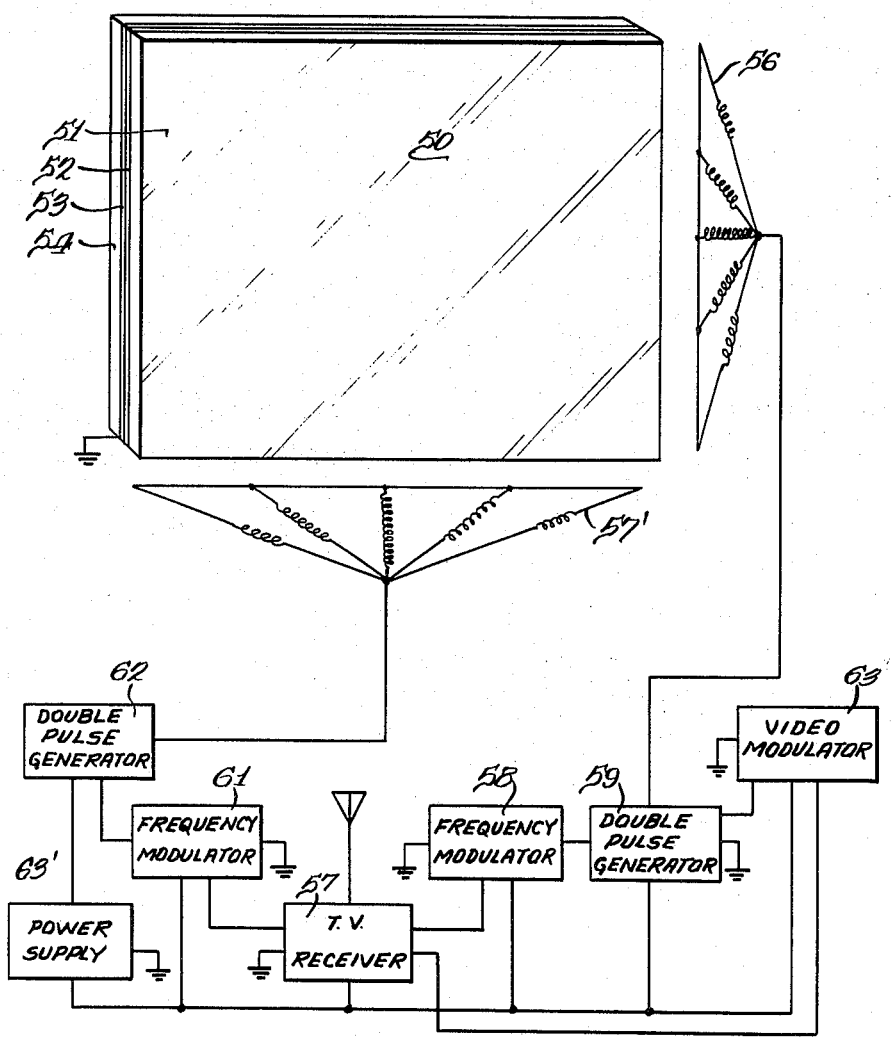

May 3, 1966 W. R. AIKEN 3,249,804
SYSTEM FOR EFFECTING SELECTIVE ENERGIZATION OF A DISPLAY
DEVICE WITH COINCIDENT WAVES
Filed Aug. 17, 1959 6 Sheets-Sheet 4
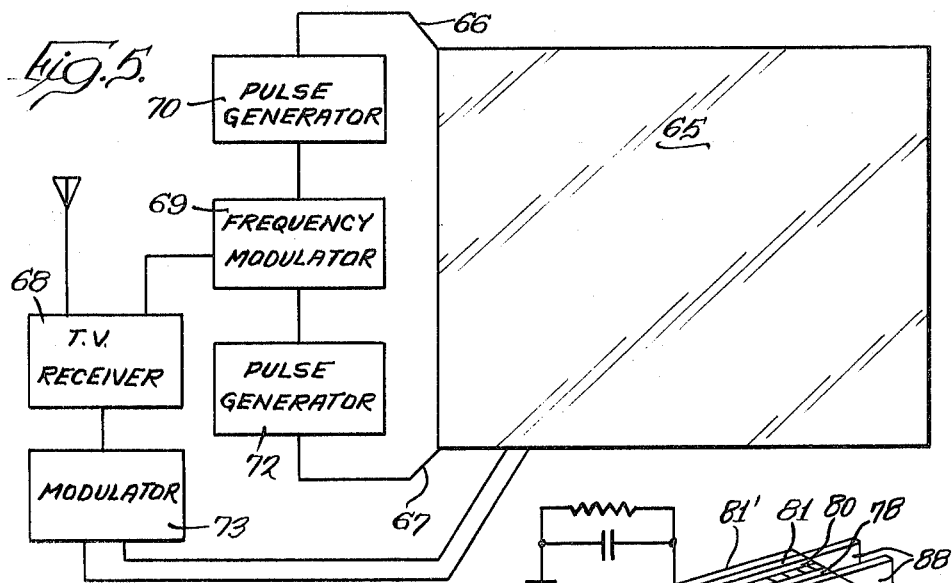
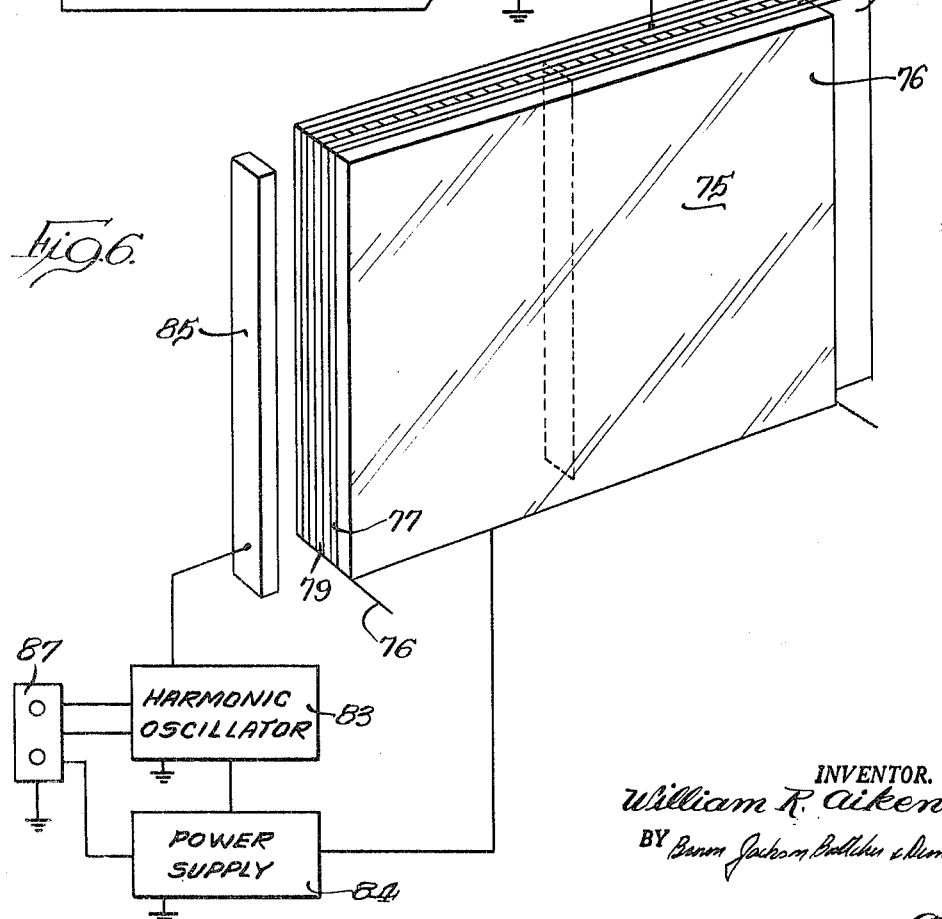
INVENTOR.
William R. Aiken INVENTOR.
William R. Aiken May 3, 1966     W. R. AIKEN     3,249,804
SYSTEM FOR EFFECTING SELECTIVE ENERGIZATION OF A DISPLAY
DEVICE WITH COINCIDENT WAVES
Filed Aug. 17, 1959     6 Sheets-Sheet 6
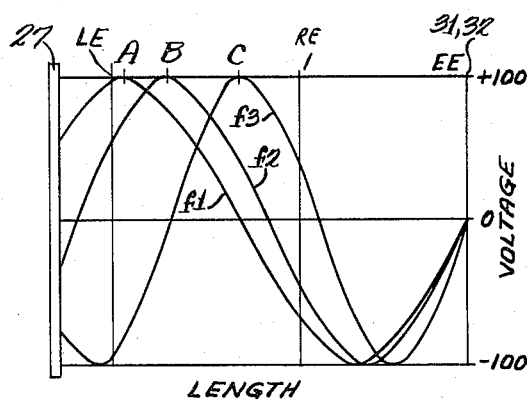
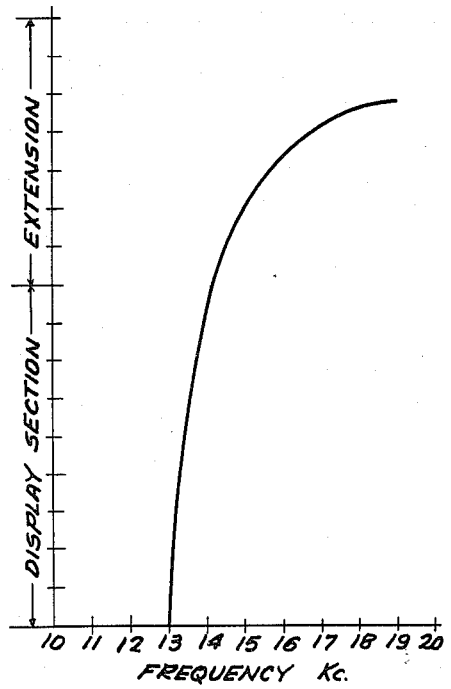
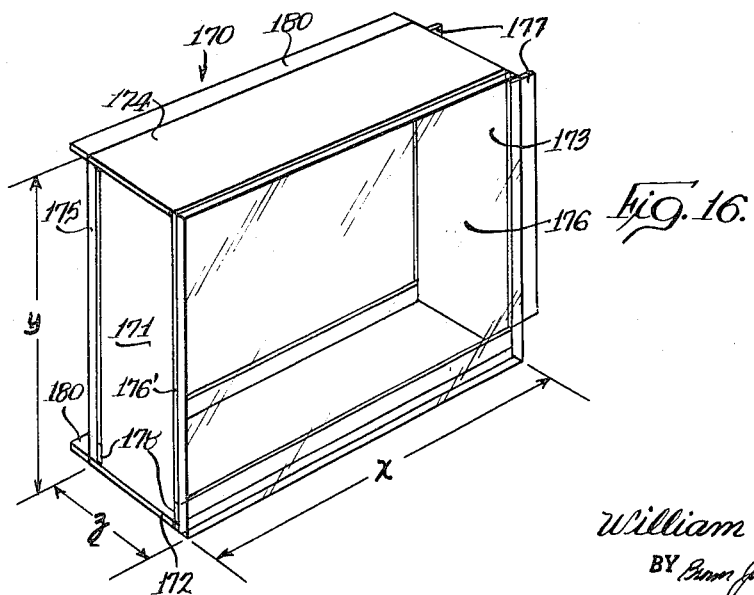
INVENTOR.
William R. Aiken United States Patent Office 3,249,804
Patented May 3, 1966

3,249,804
SYSTEM FOR EFFECTING SELECTIVE ENERGIZATION OF A DISPLAY DEVICE WITH COINCIDENT WAVES
William R. Aiken, Los Altos, Calif., assignor, by mesne assignments, to Kaiser Aerospace & Electronics Corporation, Oakland, Calif., a corporation of Nevada
Filed Aug. 17, 1959, Ser. No. 834,045
54 Claims. (Cl. 315—169)

The novel switching method and apparatus of the present invention comprises a continuation-in-part of my copending applications having Serial No. 528,222, filed August 15, 1955, now abandoned; Serial No. 544,919, filed November 4, 1955, now abandoned; Serial No. 574,192, filed March 27, 1956, now abandoned; Serial No. 687,486, filed October 1, 1957, U.S. Patent No. 2,955,231; and Serial No. 782,776, filed December 24, 1958, U.S. Patent No. 3,105,197, each of which is assigned to the assignee of the present application.

The object of the present invention is to provide a novel display device, and more specifically, to provide a novel method and apparatus for providing separate and independent excitation of minute luminous areas of a two-dimensional solid state matrix or continuum.

There is, and has been, a definite need for a panel-type display device which is operative as a transducer to convert an electrical input to an optical output which is primarily adapted for human observation. In recent programs of research and development, considerable effort and expense have been expended in the advancement of many diversified types of display media including the solid state, liquid, gaseous, evacuated, mechanical and other miscellaneous types of structures. It has become increasingly apparent in such development work that a display media of the solid state type is more readily adaptable for use in a larger number of applications, and possesses inherent operating features which dictate a preference for such type of equipment in the field.

One of the most promising approaches to the provision of a solid state display device comprises the use of an electroluminescent cell which is made of a thin layer of an electroluminescent phosphor (a material such as zinc oxide, cadmium sulfide, zinc sulfide, etc., several mils in thickness) disposed between and in sandwiched relation with a first and second conductive plate. Energization of the conductive plate with the proper potential will effect excitation of the layer of phosphor. In one known form of such type device which is adapted to provide selective independent energization of elemental areas (and thereby a visual display of video signals coupled thereto), the first and second plate conductors adjacent the phosphor are replaced by a first and a second set of parallel grids or conductors, the grid sets being disposed at right angles to each other on opposite sides of the phosphor layer. The members of the perpendicular grid sets thus establish a large number of crossover points with the phosphor layer disposed therebetween, and it is apparent that if a particular area of the phosphor is to be excited, it is only necessary to energize the conductor in each of the sets which establish the crossover point thereat. At least one of the conductor sets and the phosphor may be transparent to permit observation of the display on at least one surface of the display device.

Such arrangement, while constituting a definite step forward in the art, has not been particularly successful in the field by reason of the switching problems which have been incident thereto. That is, the electroluminescent panel is, in an electrical sense, a capacitor of fairly large loss and inherently possesses a low power factor. Since large audiofrequency voltages are required to effect a high light output from electroluminescent phosphors, the power dissipation in the electroluminescent cell may be quite high, and such factor coupled with the extremely rapid switching rate which must be effected in the use of the device in the provision of a display capable of producing a series of successive fields at the conventional television receiver rate has heretofore constituted a formidable and insurmountable problem.

Other shortcomings which are incident to the display devices which use a grid type arrangement for switching purposes include the occurrence of cross talk between the different grid wires, the lack of stability and uniformity of response over the entire display area as a result of the interference of the grids with the display, and the relatively expensive nature of the display device.

It is an object of the present invention therefore to provide a novel, solid state device which is operative as a transducer for converting electrical signals into an optical display on a solid state electroluminescent panel, and it is a specific object of the present invention to provide a novel switching method and apparatus which is operative to provide display media on solid state displays of new and novel embodiments as well as on display devices of the known type which includes grid switching structures.

The novel display device of the present disclosure in one of its most basic embodiments may comprise an electro-luminescent cell consisting of a layer of phosphor or other electromagnetic wave responsive media, disposed in juxtaposed relation with a pair of electrically conductive sheets or plates, at least one of which plates is transparent, and means for coupling electromagnetic waves or pulses to the conductive plates to travel along or in the direction of an axis thereof (in the plane surface of the plates), at least two waves being coupled thereto in a given timed relation in such manner as to intersect at a selected interval along the line and to establish a coincident wave thereat, the resultant wave at the point or line of points of coincidence being of an amplitude which is substantially larger in value than the amplitude of the individual waves, and being sufficient to effect the excitation of the area of phosphor which exists adjacent the interval of coincidence of the waves.

The electromagnetic waves coupled to the plates may comprise a pair of discrete pulses of a controlled shape and duration as provided by a pulse generator circuit, or alternatively the continuous wave output of a radio frequency oscillator which is adjusted to establish standing waves at different points therealong, the former method comprising in effect an arrangement in the time domain and the latter method comprising an arrangement in the frequency domain, although from a practical standpoint the two methods are conjugate in nature.

As shown in more detail hereinafter, the signal coupling means in the different embodiments may be adapted to couple the two waves of a set to opposite ends of the line in a given timed relation to effect the coincidence thereof at a corresponding position along the line; and alternatively, whether the line is shorted or open at one end, the two waves of each pair are coupled to a common end in a given relative timed relation, so that as the first wave is reflected from the opposite end of the line, the second wave will coincide with the first wave in its reflected travel therefrom at the desired position on the line.

As a first and a second wave are coupled to a common axis of the conductive plates in a given timed relation with each other, the two waves will coincide at a predetermined position on the axis, and will define a line at the position of coincidence which has a length which is related to the width of the plate at such position on the axis, and which is perpendicular to the axis of the line of travel of the waves. Thus if a pair of waves are coupled to the line for travel in a direction which extends along the horizontal axis of the plates of the display device, the two waves will coincide at a position on the axis of define a line of points at such position which is perpendicular to the horizontal axis, and which extends the vertical dimension of the display.

Assuming a threshold in the electro-optical elements which prevents response thereat to the travel of a single pulse along the line, and which does permit response of the phosphor to a potential of the value which is established with the coincidence of a pair of pulses on the line, it is apparent that a pair of pulses may be coupled to the conductive plates of a solid state device to provide selective energization of a line of points on the display area to the exclusion of the remainder of the display area, the location of the line being adjustable to different locations on the display area by varying the time of application of the waves to the conductive plates relative to each other.

In the selective energization of elemental areas or points on the display media in one embodiment of the invention, the two conductive plates of the electroluminescent cell are utilized as a pair of mutually perpendicular transmission lines, the first dimension or transmission line existing along a first axis (such as the horizontal axis of the conductive plates), and the second transmission line extending along a second dimension or an axis perpendicular thereto (such as the vertical axis of the conductive plates). As shown hereinafter the axis of the transmission lines in certain embodiments is not coincident with the horizontal and vertical axis of the conductive plates.

In selectively energizing a point on the display device, a first and second wave are coupled to the first transmission line (the horizontal axis in one embodiment) to coincide at the position on the horizontal axis which locates the horizontal coordinate of the point, and a second pair of waves are coupled to the second transmission line (the vertical axis) to coincide at the position on the vertical axis which locates the vertical coordinate of the point. The intersection point defined by the four coincident waves establishes a potential at such point which is related to the sum of the potentials of the four coincident waves thereat. Manifestly with a suitable threshold in the electro-optical elements which prevents response to an electromagnetic wave having an amplitude less than the amplitude of the wave which is established by the coincidence of four waves, selective energization of the different points on the phosphor may be selectively effected.

It is apparent that in each of the foregoing embodiments sequential energization of the different parts on the electromagnetic wave responsive media may be effected in a scanning pattern by adjusting the time of transmission of the waves of each successive pair of waves relative to each other, and also the time of transmission of the pairs of waves along the two different transmission lines relative to each other. Modulation of the amplitude of the coincident waves coupled to the plates may be effected according to any one of a number of known methods including adjustment of the value of the individual waves, and such modulation will effect a corresponding variation of the potential at the intersection points (and a corresponding change in the light output of the device thereat) to thereby provide a visual display of the information which is represented by the electrical signals input thereto.

In a further embodiment, two other dimensions, such as the diagonals of the conductive plates are used as the axis of two transmission lines, the one pulse of each pair being coupled to one diagonal of the display surface, and a second pulse being coupled to the second diagonal, whereby each pair of pulses trace a horizontal line on the display device, and variation of the relative time of generation of successive pairs of electromagnetic pulses will correspondingly change the vertical position of the line trace.

According to a further feature of the invention, rectifier layers are utilized to achieve a desired threshold for a display device to thereby establish an arrangement in which energization is effected only at the location of the occurrence of the coincident waves.

Other novel features of the invention are the manner in which a layer of material is included in certain embodiments to provide a reduced velocity of wave propagation along the transmission line; the manner in which extension plates are used with certain of the electroluminescent cells to permit a more flexible adjustment of the position of coincidence of the waves thereon; the manner in which rectifier layers are used to convert short energy bursts into pulses of longer duration to effect an increased light output, the manner in which a resistance layer is used with the rectifier layer in certain embodiments to permit adjustment of the time constant of the layers, and the number of new and novel electroluminescent cell structures which are particularly effective with the novel switching techniques of the disclosure.

Another feature of the invention is the manner in which the novel switching techniques are also operative with gaseous and vacuum type display devices as well as the novel solid state electroluminescent cells.

Figure 13:
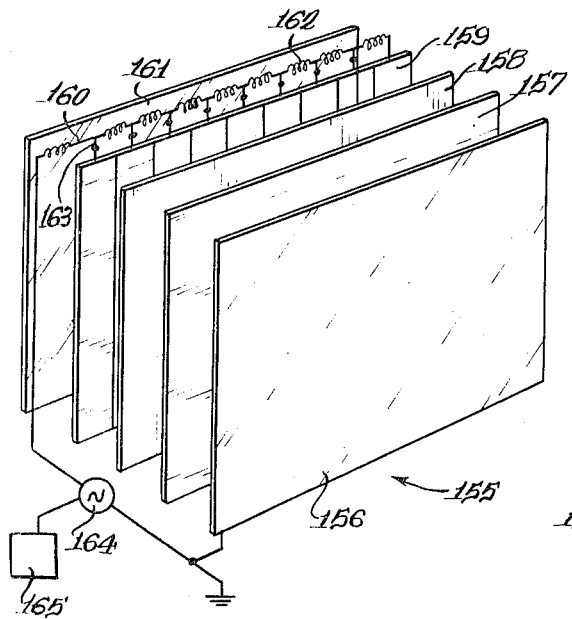

These and other objects of the invention will be apparent from the following description and accompanying drawings which serve to illustrate various exemplary embodiments thereof, and in which:

FIGURE 1 sets forth a first embodiment of a solid state electroluminescent cell and the novel switching techniques of the invention;

FIGURE 2 sets forth an embodiment of an electroluminescent cell including one specific novel switching arrangement for effecting coincident pulse switching in the different devices with the standing wave techniques;

FIGURE 3 sets forth a further specific form of an electroluminescent cell for use with the novel switching techniques of the invention;

FIGURES 4 and 5 set forth further novel electroluminescent cells and the novel apparatus for switching the cells according to the pulse techniques of the invention;

FIGURE 6 sets forth a novel cell for use in single line presentations such as are used in facsimile tubes, instrumentations and the like;

FIGURES 7–12 set forth further novel embodiments of electroluminescent cells for use with the novel switching apparatus of the disclosure;

FIGURE 13 sets forth a schematic representation of the standing waves provided in the energization of a solid state device according to the novel switching techniques of the invention;

FIGURE 14 sets forth in graphic form the frequency values for effecting the shift of the standing waves to different positions on the electroluminescent cell;

FIGURE 15 sets forth a novel lighting cell which is energized in accordance with the novel switching arrangement of the invention to provide an improved form of lighting panel; and FIGURE 16 sets forth a novel gas tube which is energized by the novel switching apparatus.

*General description of display device*

As noted above, the invention basically contemplates the transmission of a first and a second wave in the direction of an axis of the conductive plates of an electroluminescent cell in the plane surface thereof to establish a coincident wave along such plates, the coincident wave being of a value sufficient to excite a line of points on the electromagnetic wave responsive material which is located between the conductive plates.

In selectively energizing a point on the electroluminescent cell, a first pair of waves is transmitted along the horizontal axis of the conductive plates of the electroluminescent cell in given timed relation with each other to effect the coincidence thereof at a predetermined position along such axis, to thereby establish the horizontal coordinate of the desired point; and a second pair of waves is transmitted along the vertical axis of the conductor plates of the cell in a given timed relation with each other to coincide at a predetermined position along the vertical axis of the plates to thereby establish the vertical coordinate of the point. A threshold is provided in the display device to prevent the response of the electroluminescent material to waves which are of an amplitude less in value than the coincident wave which is established at the position of intersection of the first and second pair of waves. The coincidence of the four waves at a point establishes a potential difference which is of a value to establish a current flow between the plates and to effect the excitation of the luminescent material thereat.

Suitable variation of the relative time of transmission of the four waves will correspondingly vary the point of coincidence of the four waves and the point on the phosphor which is excited thereby. Various means for effecting the relative time variations of the waves are set forth hereinafter.

In the present disclosure the term "coincident wave" is used as a generic term for the wave which is established by the coincidence on a line of two or more waves or pulses and is intended to include the waves established by discrete pulses such as are provided by a double pulse generator, and also the standing waves which may be established on a line by an cw oscillator, and the like. It is also noted that the teaching herein of the transmission of a pulse "along an axis of the conductive plate" is intended to indicate the direction of travel of the wave in that the wave in its travel along an axis, as is well known in the art, will have the width of the conductive plates which conduct the same.

A display device 10 which may be energized in the novel manner of the disclosure is set forth in FIGURE 1, and basically comprises a front panel 11, which is of glass or some other suitable transparent material, on which has been deposited a transparent conducting layer 12 which may basically comprise a very thin coating of tin oxide, or other known types of transparent conductive coatings; a phosphor layer 13 disposed adjacent and in superimposed relation with the transparent conductive layer 12 which layer may consist of zinc oxide, zinc selenide, cadmium selenide, zinc sulfite, cadmium sulfite and mixtures thereof activated with copper, aluminum, etc., in the manner of electroluminescent phosphors now well known in the art; and a second conductive layer 14 coated on a supporting panel 14a of glass or metal and disposed in superposed adjacent electrically conducting relation with the phosphor layer 13. Layer 14 may be comprised of a transparent electrically conductive coating of the type utilized for layer 12, and panel 14a may be of glass or other suitable transparent material, whereby the display may be viewed from either side of the cell. Alternatively, the conductive layer 14, 14a may be replaced by a metallic plate which forms the second conductor member of the display device.

A first pair of signal coupling members or radiator 15, 15a are disposed adjacent the left hand vertical marginal edge of the two conductive plates 12, 14 of the display device 10 respectively and signal coupling members 15b, 15c which may comprise a pair of metallic bus bars are disposed adjacent the right hand marginal edge of the two conductive plates 12, 14. A further set of signal coupling devices or radiators 16, 16a are disposed adjacent and in electrically coupled relation with the lower marginal edge of the conductive plates 12 and 14, respectively, and a set of signal coupling devices or radiators 16b, 16c are disposed adjacent and in electrically coupled relation with the upper marginal edge of the conductive plates 12, 14. Conductor means 19 is a multipath conductor which is connected to couple the signal output of pulse generator equipment over separate paths to the proper ones of the radiators 15–15c and 16–16c.

Coupling members 15, 15a couple wave propagation a first wave of a pair to the conductive plates 12, 14 for travel along the horizontal axis thereof in the direction of the coupling members 15b, 15c, and wave propogation members 15b, 15c couple a second wave of a pair to the conductive plates 12, 14 for travel along the horizontal axis of the plates 12, 14 in the direction of the coupling members 15, 15a. Manifestly, the two waves which are traveling toward each other will intersect at a position along the horizontal axis to provide a coincident wave thereat which is of a substantially increased value, the relative time of application of the two waves of the pair determining the position of intersection of the wave pair along the horizontal axis.

In a similar manner coupling wave propogation members 16, 16a couple one wave of a second pair to the conductor plates 12, 14 for travel along the vertical axis thereof in the direction of coupling members 16b, 16c and coupling wave propagation members 16b, 16c couple the second wave of the second pair to the vertical axis of the conductor plates 12, 14 for travel along the vertical axis of the conductor plates 12, 14 in the direction of the coupling members 16, 16a. The two waves which are traveling toward each other along the vertical axis will intersect at a position along the vertical axis to provide a coincident wave thereat which is of a substantially increased value, the position of intersection on the vertical axis being determined by the relative time of application of the two waves of the second pair to the conductive plates.

In the showing of FIGURE 1, the dotted line 18 indicates the position of intersection along the horizontal axis for the first and second wave of the pair waves which are coupled over conductor 19 and the signal coupling means 15–15a for travel along and intersection on the horizontal axis of conductive plates 12, 14, and dotted line 17 indicates the position of intersection along the vertical axis for the pair of waves which are coupled over conductor 19 and radiator means 16–16a for travel along and intersection on the vertical axis of the conductive plates 12, 14. It is apparent that lines 17 and 18 are each the resultant of the coincidence of two waves and that the coincidence of four waves occurs only at the point of intersection of the two lines 17 and 18. With an electro-optical element 13 which has a threshold which prevents response of the phosphor to a wave which is of a value less than the amplitude of less than four coincident waves, the line of points 17 and 18 each alone will not be of an amplitude which will excite the luminescent layer 13 and that illumination will be effected only at the point of crossover or intersection of the two lines 17 and 18.

The position of the point may be adjusted by varying the relative time of coupling of the pulses of each pair to the plates. Thus the line of points 18 may be adjusted to the median vertical axis of the plates by effecting a simultaneous coupling of a first and a second pulse to the plates by the coupling devices 15, 15a and 15b, 15c respectively, whereby each of the two pulses travels the same distance along the horizontal axis prior to intersection, and such intersection will occur along the median vertical axis of the plate. In a similar manner the horizontal line 17 may be adjusted to occur at the median horizontal axis of the plates by effecting a simultaneous application of a pair of pulses to the vertical axis of the conductor plates 12, 14 by coupling devices 16, 16a and 16b, 16c, respectively, whereby each of the two pulses travels the same distance along the vertical axis prior to intersection, such intersection therefore occurring along a line of points which is coincident with the median horizontal axis of the plates. Manifestly the waves of the first pair and the waves of the second pair must also be relatively timed to effect coincidence at the midpoint of the plates. The manner in which the lines 17 and 18 may be adjusted to different positions of intersection on the conductive plates will be apparent therefrom.

As shown in more detail hereafter, the display device of FIGURE 1 may be energized by pulse generator means which are controlled to couple pairs of shaped discrete waves or pulses over conductor 19 to radiator means 15–15a and pairs of discrete waves or pulses over conductor 19 to radiator means 16–16a. In a similar manner, the device may be energized by an RF oscillator which is controlled to couple continuous waves over conductor 19 to radiator means 15–15a to thereby effect the establishment of a standing wave at given positions along the length of the horizontal transmission line, and an RF oscillator which couples continuous waves over conductor 19 to radiator means 16–16a to establish a standing wave at a given position along the length of the vertical transmission line.

The point of intersection of the standing waves established by the continuous waves, as in the case of the discrete pulses, determines the point of energization on the phosphor of the display device, the equipment for effecting the application of such signals to coupling means 15 and 16 being shown in more detail in FIGURES 2 and 3. Such means may include frequency modulator means for adjusting the frequency output of the oscillator units to different values to thereby vary the position of the standing waves along the length of the plates. Other means include changing the electrical length of the line, and shifting the electrical position of the line relative to the display area as more fully taught hereinafter.

*Standing wave switching method and apparatus*

As noted above, the invention contemplates the energization of a solid state cell by the establishment of coincident waves at the point thereon which is to be energized. The coincident waves according to the invention may be established by coupling discrete pairs of pulses to the conductive plates of the display device, or by coupling continuous waves thereto to establish coincident standing waves at the desired point of energization.

With reference to FIGURE 2, there is shown thereat an embodiment of a display device 20 connected for energization by the continuous wave switching techniques to provide standing waves at the desired point of coincidence. As there shown, the display device 20 comprises a first panel 20a, which may be of glass or some other suitable transparent material, upon which has been deposited a coating of transparent conducting material 21, an electroluminescent phosphor layer 22, a resistance layer 23, a rectifier layer 24, and a second transparent conducting layer 25 which is coated on a suitable supporting panel 26, which may be of glass or some other suitable transparent material. The second electrode layer 25 may, of course, comprise a metallic plate in lieu of the transparent coating on glass.

The phosphor layers and conductive layers may be comprised of material similar to that set forth in FIGURE 1, and the rectifier barrier layer 24 may comprise any of a number of semi-conductor materials including the well-known selenium rectifier layers which are formed on aluminum in the manner customary in the selenium rectifier art. In certain embodiments it may be necessary to utilize several selenium rectifier layers in series to withstand the voltages which are coupled to the electroluminescent layer, the rear conductive layer may be of an aluminum material if desired to form both a conductive plate for the transmission lines and a section of the barrier layer. Other well-known types of rectifier layers may also be used in such arrangement. As shown hereafter, the rectifier layer 24 is used in arrangements in which a threshold other than that inherent in the phosphor media is desired. Thus, if the phosphor or other electromagnetic wave response media inherently includes the threshold which is desired, the rectifier layer is not required.

The rectifier layer 24, as used, establishes a threshold for the phosphor of the display device, the rectifier layer operating as a diode to pass a current only when its proper bias voltage is exceeded in the predetermined direction. In creating a threshold in the phosphor, it is apparent that the peak of the electromagnetic standing wave may be used for excitation purposes. That is, the threshold in the phosphor is effective in eliminating phosphor responses to potentials below a certain value. Thus in an electromagnetic standing wave having both a positive and a minus peak, only one of the peaks will be effective in creating light on the phosphor screen. Since all potentials which are not of the proper character (or which do not exceed the bias value created by the threshold in the phosphor) are not dissipated in illuminating the phosphor, the total power requirements of such a device are greatly minimized.

The phosphor layer 22 in certain embodiments may comprise a mixture of phosphors and a high dielectric substance, such as barium or strontium titanate, a ferromagnetic material, or any one of a number of well-known substances which have the property of reducing the velocity of wave propagation. In accordance with standard transmission line theory, it is thus possible to reduce the speed of the waves in the travel thereof along the plates and thereby alter the frequency at which the device will best respond.

The use of a resistance layer 23 in certain embodiments permits the use of an increased number of electromagnetic responsive materials in layer 22 without being limited to the materials which have the exact response criteria for the particular voltages and frequencies which are applied to a given display device for maximum response.

As noted above, the rectifier layer 24 is operative to establish a threshold whereby only the sharp peak of each wave is permitted to energize the phosphor material. The rectifier layer also converts a wave of short duration (relative to each incremental picture area) to a wave of longer time duration which is more compatible with the requirements of the phosphor. Since the energizing peaks for each picture area is of short duration, the phosphor light output may be of a low value in high frequency scanning embodiments. However, in accordance with known principles, the rectifier portion of each picture element will store energy for a length of time determined by the capacity of the circuit (largely phosphor in the display device) and the leakage rate of the circuit is determined by the resistance of the phosphor, the back resistance of the rectifier layer 24, and the resistance of the resistive layer 23. It is apparent that the leakage rate (and therefore the sustained time of the energizing potential of each peak applied to a point on the phosphor) may be preadjusted to an optimum value by adjusting values of the resistance of such elements to the value which permits maximum light output.

In certain embodiments the phosphor material may inherently have such resistance as to negate the need for a resistance layer. In such event, the material should not be of such low resistance that it will short thereacross. However, it should be of a resistance sufficiently low to permit the bleeding off of the accumulated charge on the phosphor which may result from the passage of current thereover in each excitation of the display material. Specifically stated, in each of the different types of electroluminescent display cells, the resistance of the phosphor must be matched to the value of the voltages which are coupled thereto provide the maximum response, and the use of different value resistance layers permits the use of correspondingly different phosphor materials.

Vertical radiator means 27 are disposed along a vertical marginal edge of the display device, and as shown in FIGURE 2, radiator means 27 are comprised of a plurality of equal length conductors 27a which are connected to common terminal and over conductor 27b to a first output terminal of a signal generating circuit 28. Horizontal radiator means 29 which are disposed along a horizontal marginal edge are comprised of a plurality of equal length conductors 29a connected to a common terminal and over a common conductor 29b to a second output path of the signal generator circuit 28.

The signal coupling devices 27 and 29 shown in FIGURE 2 each comprise a number of conductors which are of equal length in order to establish a uniform delay in the travel of the wave from the signal generator circuit 28 to the conducting plates of the display device which form the transmission line for the pulses, whereby a uniform wave front is experienced by all of the terminal points of the conductors as connected to the conductive plates, and the phase of the wave is maintained uniform throughout the entire length of the transmission line. The signal coupling members of FIGURE 1 may also be used in the present structure in lieu of the radiator members. The first transmission line which is established along the horizontal axis of the conductive layers 21 and 25 is extended in the horizontal direction by transmission line extension members 31 and 32, and the second transmission line which is established along the vertical axis of the conductive layers 21 and 25 is extended in the vertical direction by transmission line extension members 33 and 34. The extension of each of the transmission lines permits the provision of a standing wave form of a wave length sufficient to establish at least one peak within the bounds of the display area of the device, the further purpose of the transmission line extension members being set forth in more detail hereinafter.

The signal generator circuit 28 basically comprises a conventional TV receiver circuit 35 having a horizontal sweep signal generator, the output of which is coupled to a frequency modulator circuit 36 to thereby control the frequency output of an RF oscillator 37, which is coupled over conductor 27b to the vertical radiator means 27 and the conductive plates 21, 25. The signal output of RF oscillator 37 is thus transmitted along the horizontal axis of the conductor plates in the manner of a transmission line. The vertical sweep generator circuit of the TV receiver 35 is connected to a second frequency modulator 38 which is operative to adjust the frequency of generation of the waves by a second RF radio frequency oscillator 39 which are coupled thereby over conductor 29b to the horizontal coupling device 29 for transmission along the vertical axis of the conducting layers 21, 25 in the manner of a second transmission line perpendicular to the first line.

The manner in which the different parts are selectively energized on the phosphor by the coincident waves in a scanning operation will be readily apparent from the foregoing description.

Briefly stated, it is apparent from known transmission line phenomena that the occurrence of a standing wave on a transmission line establishes potential differences between the conductor lines. Thus by establishing a standing wave in which the peak of the wave occurs at the position along the axis at which the energization of the phosphor is to occur, and by adjusting the value of the peak at such position to just exceed the threshold of the layers, current conduction will be established between the plates and the phosphor will be energized thereat. If a standing or coincident wave is established along one axis alone, a line of points will be energized. The simultaneous establishment of a standing or coincident wave along a second axis mutually perpendicular to the first axis will provide energization at the point of intersection of the waves (assuming the threshold for the electroluminescent material has been so adjusted).

In the illustrated embodiment, as the continuous wave output of RF oscillator 37 is adjusted to a given frequency and coupled over conductor 27b to signal coupling members 27 and the conductive plates 21, 25 for travel along the horizontal axis thereof, a standing wave will occur at a position along the horizontal axis which is primarily determined by the frequency of the continuous waves in the illustrated embodiment, although as shown hereinafter the length of the line, the velocity of propagation of the waves, etc., may be varied to also adjust the wave to different positions. At the same time the continuous wave output of RF oscillator 39 is coupled over conductor 29b at a given frequency to signal coupling members 29 and the conductive plates 21, 25 for travel along the vertical axis thereof to establish a standing wave at a position along the vertical axis which is determined by the frequency of the waves. The potential at the point of intersection of the two standing waves is of a value to exceed the phosphor threshold and to energize thhe phosphor thereat, the threshold being established as noted heretofore to prevent response of the phosphor to single waves or coincident waves of a value less than the value of two coincident standing waves.

Movement of the peak of the standing waves along the horizontal and vertical axis of the transmission lines will effect a corresponding adjustment in the location of the energized point. Such movement may be readily effected according to the invention by adjusting the frequency output of the RF oscillators to different values, by electrically adjusting the length of the line, by adjusting the position of the line, and by effecting simultaneous adjustment of several of the foregoing characteristics, such as simultaneously varying the length of the line, and varying the frequency, etc.

With reference to FIGURE 13, there is schematically shown thereat the manner in which a standing wave may be shifted to different positions along an axis of the plates. As there shown, signal coupling members 27 are disposed adjacent one vertical end of the conductive plates to couple the continuous waves thereto at different frequency rates to establish standing waves at different positions along the length thereof. Line RE indicates the right hand edge of the display section; line LE indicates the left hand edge of the display section, and line EE indicates the end of the extended portion of the transmission line formed by extension conductors 31, 32.

The sine waves $f1$, $f2$, $f3$ indicate the potential differences which will exist between plates 21 and 25 and their extensions at each successive segment along the length of the transmission line with the application of the illustrated waves. Assuming that the wave is initially established at point A as a result of the coupling of waves to the horizontal axes at a first frequency $f1$, it will be apparent that a vertical line of maximum potential difference between the plates will be established at point A along the horizontal axis. Variation of the value of the frequency of the continuous wave to value $f2$ will adjust the line of energization to point B and variation of the frequency to value $f3$ will adjust the line of energization to point C.

In one embodiment a standing wave was established on a transmission line to excite the phosphor along a vertical line adjacent the left hand marginal edge of the display with the application of a frequency of 13 kc. thereto, and the standing wave was controlled to move along the horizontal axis of the display portion with variation of the frequency from 13 kc. to 14.4 kc. As shown in FIGURE 14, a variation of the position of the standing wave from the edge of the display point toward the shorted end of the line required a much greater frequency shift. It was also observed in such tests that when both ends of the line are open or shorted reflection occurs at both ends to provide a coincident pulse of a correspondingly increased amplitude. In such arrangement, other means of shifting the standing wave are required as noted in more detail hereinafter.

As noted above, the standing wave may also be shifted along the horizontal axis by maintaining a constant frequency output and varying the electrical length of the line. In such arrangement the output of the horizontal and vertical sweep generators of the television receiver (or other control equipment if the device is used in the presentation of other types of information) are connected to provide direct current control signals to an inductance member which is connected to the conductive plates at one end thereof, and which as changed in value, electrically changes the length of the line. Manifestly, shortening of the line length will move the standing wave in the direction of the signal coupling end of the display device and lengthening of the line will move the standing wave in a direction away therefrom. A variable capacitance member, or other equivalent electrical component which will effect variation of the length of a transmission line, may be used in a similar manner.

According to a further embodiment of the invention, the transmission line may be electrically shifted relative to the standing wave. That is, a first variable capacitor (or inductance) is connected to the end of the conductive plates 21, 25 adjacent the signal coupling means 27 and a second variable capacitor (or inductance) is connected to the end of the conductive plates 21, 25 adjacent the end removed from the signal coupling means 27. It is apparent that by simultaneous adjustment of the capacitor (or inductance) members at the opposite ends of the transmission line in an opposing manner, the line will be lengthened at one end and shortened at the opposite end to electrically "move" or "shift" the line relative to the signal coupling means 27, and the standing wave will be established at a correspondingly different position on the horizontal axis of the display device.

It is apparent that various ones of the foregoing methods (and others) may be employed in combination to effect movement of the standing wave along the axis of the plates; and such arrangements are believed to be within the scope of the teaching of the invention. The brightness of the image displayed on the phosphor screen may be varied by modulating the amplitude of the electromagnetic standing waves which are coupled to the line by horizontal and vertical signal coupling devices. Alternatively, or simultaneously, brightness may be controlled by varying a bias potential across the plates of the phosphor screen, by modulating the amplitude of the electromagnetic standing waves, or by applying a bias voltage to one plate of the transmission line and modulating such bias. A wide range of brightness and contrast may therefore be achieved in the optical display of the electrical input signals. An alternating current bias is provided for phosphors which do not respond to direct current bias.

In certain embodiments of the display it may be desirable to include a background glow and to establish different light intensities relative to such background glow to effect the desired presentation. In such arrangement a bias is coupled to the two electrically conducting plates of the display device, whereby a constant current flow passes through the electroluminescent phosphor material to cause the entire display area of the device to be illuminated at a lower intensity to establish a fixed or base background glow when no wave is being transmitted.

It is apparent from the foregoing description that any one of a number of conventional circuits may be employed in the establishment of electromagnetic waves on the transmission lines, and that pulses of any width or shape may be readily synthesized by the superposition of sinusoidal frequency components on such lines. The following considerations of the nature of different waveforms which may be provided for different embodiments are therefore merely set forth as an aid to the practice of certain refinements of the invention, and for the purpose of disclosing certain theory which is basic to the invention, and such disclosure is not to be considered in any way as limiting of the scope of the invention or its application.

It is initially noted that a pure standing wave may be established on the transmission line by coupling equal amplitude traveling waves of the same wave length to the line at a given frequently rate, which waves travel to an interval of coincidence on the line. In that the transmission line is a linear device, a number of standing waves of different frequencies may be present simultaneously to thereby produce a complex envelope. Since the instantaneous voltages in each of the waves are additive to provide the voltage on the line, the complex envelope need not be the sum of the envelopes of the component standing waves.

CW oscillators and amplifiers are more readily constructed and operate at higher frequencies than pulse generators and wide-band amplifiers, and accordingly pulse synthesis from Fourier components provides optimum results in the establishment of electromagnetic waves in certain embodiments of electroluminescent display devices. Dynamic predistortion in the form of amplitude and phase variation with scan position may also be applied to the driving components, such arrangements being of especial usefulness in arrangements in which the transmission lines are unusually dispersive along their length.

A high resolution panel display is provided in certain embodiments by combining standing waves to create sharply peaked envelopes, the envelopes being developed in a controlled manner at the desired intervals on the line. Two such standing wave patterns transmitted along mutually perpendicular transmission lines, as noted above, will provide high excitation at the intersection of the high voltage peaks, and low excitation elsewhere over the display. Scanning or movement of the interval of coincidence is effected by altering the frequencies of excitation in the arrangement of FIGURE 2. However, phase modulation, or variation of the electrical length of the line, etc., as noted above, will provide a similar adjustment of the interval of coincidence to different parts along the line. The sharply peaked pulses which are provided in arrangements in which harmonics are provided especially adapt such apparatus for use in applications in which high resolution is desired.

Standing waves may be generated by driving each of the transmission lines from the respective ends thereof, as shown in FIGURE 1, rather than by the reflective arrangement set forth in FIGURE 2. In such arrangement scanning of the excitation spot may be achieved by phase shifting one or both of the radio frequency signals, which phase shift would be achieved responsive to the variation of the horizontal and vertical sweep signals of the TV receiver 35 as coupled to the frequency modulators 36 and 38 respectively.

Standing wave envelopes repeat at one-half wave length intervals along the line, and a complex envelope resulting from a fundamental in harmonics will repeat at one-half wave length intervals of the fundamental. If only one voltage peak is to occur in the display length L, the wave length of the fundamental cannot be less than 2L. If the phase velocity in the transmission line is V, then the fundamental frequency should not be higher than $V/2L$. In arrangements which provide harmonic pulses, phase modulation may be readily used to provide energization of corresponding different points on the display device.

As noted above, in certain arrangements it is desirable to include extension members 31, 32 and 33, 34 which in effect comprise an extension of the transmission lines on the conductive plates 21, 25 which are located at the far end of the display relative to the point of application of the pulses, such arrangement being particularly desirable in the embodiments wherein a fixed termination is employed and the frequencies are varied to scan the excitation point. That is, if the transmission line were of the same length as a phosphor screen, it would be necessary to fluctuate the wave length through a considerable range in order to move the point of the peak of the standing wave. Utilizing only a portion of a transmission line for the display area, the wave length need only be modulated through a short range to move the wave peak from one end to the other of the display area, as graphically shown in FIGURE 14.

The conductive plates 21, 25 in certain arrangements are comprised of a conductive coating having high dielectric constant materials mixed therein for the purpose of reducing the phase velocity. Such arrangement is especially useful in display devices which are energized by standing waves.

Amplitudes and phase angles of the individual components may be adjusted as a function of scanning position so that attenuation and phase distortion result in the desired pulse shape at the desired scanning position.

In that the electromagnetic wave transmitted by the horizontal radiator will tend to also follow the vertical transmission line, and vice versa, transmission lines may be adjusted to non-equal lengths so that a frequency different from the horizontal wave may be employed for the vertical wave. Wave filters (not shown) may be employed in each of the transmission line extensions to restrict the wave to that of the proper frequency.

The foregoing considerations, as noted above, will have application in numerous embodiments of the solid state display devices.

In one further specific embodiment, which is shown in FIGURE 3, for example, a separate set of channels are provided within the display section of the cell to respectively accommodate the vertical and horizontal electromagnetic coincident waves, and thereby further isolate the vertical and horizontal electromagnetic waves which are transmitted to establish the coincident waves. The display device 40 as there shown, comprises a front transparent panel 41 upon which has been deposited a conducting film 42 and a rear conducting panel 43. A perforated supporting section 44 is disposed in superposed and sandwiched relation with the conductive plates 42 and 43, and cylindrical tubes 46 are inserted in each of the plurality of perforations in the perforated panel for support thereby, the one end of each of the tubes being supported in contacting relation with the front conducting panel 42 and the rear surface thereof being supported in contacting relation with conducting panel 43. Each tube comprises electroluminescent phosphor 47 disposed in such manner that the one end thereof is in face-to-face contact with the conducting panel 42. The other end of said cylindrical tube 46 contains a rectifier layer 48 which is in contact with the phosphor to form a semi-conductive contact layer between the two conductive plates. Potential is connected to one conducting plate and ground is connected to the other conducting plate to provide the necessary power supply for the current flow to the electroluminescent phosphors whenever the threshold potential is overcome at the point of coincidence of the peaks of the two electromagnetic standing waves at a point on the conductive plates 42, 43, in the manner described hereinabove. Such structure is also operative with the discrete pulse apparatus of FIGURES 4 and 5 which is now set forth hereat.

*Electromagnetic energization of solid state display device by coincidence of pulses*

The basic principle involved in the employment of pulse techniques for the excitation in the matrix or continuum of light-emitting or light-absorbing elements over a two dimensional area is similar to that set forth in the description relating to the standing wave embodiments of FIGURES 1–3. That is, a display is presented on the electroluminescent panel by impressing a series of pairs of electromagnetic pulses along a first and a second mutually perpendicular transmission lines which are established along the horizontal and vertical axes of the two conductor plates of the display device. Each electromagnetic pulse of a pair serves to create a moving line of voltage between two conductors in its travel along the axis of the conductor plates. In an electro-optical display device wherein the voltage threshold is such as to effect a significant light output only when the sum potential of two or more waves exceeds that produced by the value of the individual traveling wave, it is apparent that a line of light may be established at an interval along the axis of the transmission line to which the pulses were applied, such interval being determined by the point of coincidence of the two pulses. Manifestly the line of light may be moved across the display device by the simple expedient of varying the time of application of the pulses to an axis relative to each other to thereby vary the point at which coincidence occurs. As in the standing wave embodiment, a point of light may be established at any point on the surface of the display device by coupling a second pair of pulses to the conductor plates along an axis which is perpendicular to the first axis to establish a line of points which is perpendicular to said first line. The point of crossover of the two lines (and therefore the point of intersection of the four pulses) thus establishes a sum potential at the point of intersection which exceeds the phosphor threshold to effect energization of the electroluminescent phosphor thereat.

With reference now to FIGURE 4, there is shown an electroluminescent display device 50 which basically comprises a multi-layer structure including an outer support panel 51 comprised of a transparent material such as glass, which has a conductive film 52 painted or coated on the rear surface thereof; an electroluminescent layer 53 comprised of an electroluminescent material such as zinc sulfide, cadmium sulfide, cadmium selenide, etc., and a second conducting electrode 54 which may comprise a glass panel having a thin conductive coating or which may alternatively comprise a metallic electrically conducting panel.

A radiator member, such as vertical signal coupling device or radiator 56, is disposed adjacent the vertical marginal edge of the display device, and signal coupling or radiator member 57' is disposed adjacent the horizontal marginal edge of the display device. Although the signal coupling devices are shown in spaced relation with the plates to illustrate such form of coupling, it is apparent that direct coupling and inductive coupling may also be used. In the illustrated arrangement, the rear conductive plate 54 of the line is grounded and the signal coupling members 56 and 57 are disposed in signal coupling relation with the forward conductive plate 52.

Signal coupling member 56 is operative to couple a first and a second pulse for transmission along the horizontal axis of the conductive plate members 52 and 54, the time of application of the first and second pulses being different and variable, whereby a line of potential of an increased value is established at the interval along the horizontal axis of the plates at the intersection of the first and second pulses.

Signal coupling device or radiator 57' is operative in a similar manner to couple a first and a second pulse to the horizontal edge of the display device for transmission along the vertical axis of the conductive plates 52 and 54, the difference in time of application of the pulses determining the particular interval of intersection of the pulses along the vertical axis of the second transmission line, and thereby the point of increased potential which is established thereby. The crossover point of the two lines thus established determines the point of energization on the display device.

In one application in which the display device may be utilized to effect the display of television signals, a television receiver 57 is connected to couple the horizontal sweep signal output thereof to a frequency modulator 58 which in turn is operative to control a double pulse generator 59 in its application of successive pairs of pulses to the vertical radiator 56, the time interval between the pulses of successive pairs being adjusted by the frequency modulator 58 to effect movement of the line of potential established by each successive pair of pulses across the display device from left to right in a scanning motion at the rate of scan of a horizontal line in a conventional television raster.

The television receiver 57 is also connected to couple the vertical sweep signal output thereof to a second frequency modulator 61 which is in turn operative to control a double pulse generator 62 in its application of successive pairs of pulses to the horizontal radiator member 57′, the time interval between the pulses of successive pairs being varied by the frequency modulator 58 to advance the horizontal line of coincidence across the display from top to bottom at the rate of a vertical trace of a conventional television raster.

Conducting plates 52, 54 are connected to video modulator 63 in such manner that a control potential is coupled therebetween, adjustment of the potential across such conductor plates by the modulator 63 determining the direction and amount of potential necessary to cause a current flow between the plates. The video output of the receiver 57 is thus operative to control the brightness of each point as energized on the display device. The brightness can also be controlled by connecting one or both of the double pulse generators 58 and 64 to the television receiver 57 so as to change the amplitude of the output pulses of the double pulse generator, and thereby the sum potential of the electromagnetic waves at the point of intersection. Conventional power supply means 63 provide the necessary power for the system.

A four-fold coincidence of the pulse may be provided by exciting both lines from both ends or both lines from one end with reflective terminations. It is also apparent that triple coincidence of electro-magnetic waves with double-end excitation or the reflective termination of only one line in a single train of traveling pulses in the other line may also be used to excite the display device.

In a further arrangement, pulses of alternating polarity may be provided in one or both transmission lines, such arrangement being possible in double-end excitation and reflective termination embodiments, since a shorted line is reflective with pulse inversion, whereas an open line is reflective with preservation of pulse sign. Such arrangement also contemplates doubling of the pulse repetition rate since pulses of opposite sign can intersect without producing excitation.

As in the embodiment set forth relative to the standing wave arrangement in FIGURE 2, if the conductive plates forming the transmission line are constituted of a conductive material mixed with a material having a high dielectric constant, the pulse duration may be increased proportionately to the square root of the dielectric constant without loss of resolution. The reduction of phase velocity in the transmission line will increase the frame time for display of a given number of elements by the same factor as the increase in pulse duration.

In a second embodiment set forth in FIGURE 5, a display device 65, which is similar in construction to that shown in FIGURE 4, is adapted to be energized by electromagnetic pulses which are coupled thereto by a first signal coupling device 66 and a second signal coupling device or radiator 67, which are disposed at the upper left hand corner and the lower left hand corner of the display device respectively. The first signal coupling device 66 effects coupling of one of a pair of pulses to the first transmission line which has an axis extending along the first diagonal of the display device, and the second signal coupling device or radiator 67 couples the other of a pair of pulses along a transmission line which has an axis coincident with the second diagonal of the display device, it being apparent that the arrangement as in the previous arrangements contemplates the transmission of pulses along two transmission lines which are angularly disposed relative to each other.

The conductive plates of the display device in such arrangement are connected at the edges by a coating of resistive material (not shown) so that the resistance at any point on the edges of the tube, with the exception of the corners of application of the electromagnetic pulses, is equal to the characteristic impedance of the two conductive plates acting as a transmission line, the resistive coating thereby preventing reflection of the pulses. A sheet of ferromagnetic material, or another type of high dielectric constant or any other substance, such as barium titanate which has the property of reducing the velocity of propagation of electromagnetic pulses may be disposed as a layer of the tube as in the previous embodiments.

In the presentation of a television display, the input signals are coupled over a conventional television receiver 68 to a frequency modulator 69, which controls a first pulse generator 70 in the coupling of one pulse of a pair to radiator 66, and which controls a second pulse generator 72 to effect the coupling of the second pulse of a pair to radiator 67, the frequency modulator 69 effecting a successive differential in the time between application of the pulses of each successive pair.

Modulator unit 73 connected to the television receiver 68 varies the intensity of the spot of light as it moves across the screen to thereby effect a variation in the voltage which appears between the conductive plates of the display device. The varying voltages thus provided add to or subtract from the voltages created by the intersecting radiated waves to effect modulation of the picture brightness.

In operation the radiators 66 and 67 each couple a pulse to the display device, and the threshold of the device is sufficient to prevent excitation of the electroluminescent phosphor in their independent movement along their associated transmission lines. However, at the point of intersection of the waves the sum potential which is created by the crossover point is sufficient to effect the energization of the corresponding point on the phosphor target.

In establishing the first horizontal line adjacent to the upper horizontal edge of the display device, it is apparent that the first pulse must be coupled to the display device by the radiator 67 for travel along the transmission line which has an axis extending from the lower left hand corner to the upper right hand corner of the conductive plates, and that the second pulse of the first set is to be applied by the radiator 66 as the first pulse travels to the location of the diagonal which extends from the upper left hand corner to the lower right hand corner. The further travel of the two pulses along their respective transmission lines will effect the tracing of the horizontal line across the display device immediately adjacent the upper marginal edge thereof. The second horizontal line of the raster may be drawn by the second pair of pulses which are coupled to the respective transmission lines by correspondingly reducing the time interval between the application of the two pulses thereto. Thus each pair of pulses will establish one horizontal line of excitation across the display device, and by modulation of the voltage coupled to the conductive plates of the display device, the voltages created by the intersecting radiated waves will effect the excitation of the phosphor in accordance with the nature of the input signals to the television receiver 68 which are in turn coupled to the modulator unit 73. A threshold layer may be utilized with the display device in the manner of the embodiments previously described herein.

A further embodiment of a display tube device which is operative with the circuitry for coupling radio frequency waves or pulses to the marginal edges thereof is set forth in FIGURE 6. As there shown, the device 75 comprises an outer panel 76 comprised of a transparent material, such as glass, which has a conductive film 77 coated on the rear surface thereof. A phosphor layer 78 comprised of electroluminescent phosphor such as those described above, is disposed in contacting relation with the conducting film on the glass panel by the well-known liquid settling process or by any other well-known process for applying phosphor coatings thereto. A conducting film 79 which may be formed in segments insulated from each other in the direction of the wave transmission (each segment of which is conductive between the layers), is disposed between the phosphor layer 78, a semiconductor element 80, and a rear conductor panel 81 backed by a glass member 81'. The intervening film may be eliminated in the event that the phosphor has sufficient conductivity to provide a contact surface with the semiconductor segment as hereinafter described. Ostensibly such film may also be utilized as a resistance member for draining the accumulated charges on the phosphor to ground as desired.

The semiconductor layer 80 may be of any of a number of well-known types of layers, the nature of the material being such as to provide unilateral conductivity thereacross. Other materials well-known in the art may be provided for such arrangement, it being noted that the direction of current flow is immaterial to the successful operation of the structure, it being only necessary to connect the conductive panel 77 and conductive panel 81 to the energizing source so that with the aid of the semiconductor section current flow is normally cut off. The excitation of the phosphor at any point or series of points is accomplished by the application of a potential signal to such point or points which is of a potential sufficient to overcome the biasing potential connected thereto.

In the arrangement of FIGURE 6, the energizing signal for the display device is provided by a harmonic radio frequency oscillator 83 which is connected to a power supply 84, or if desired to a separate power supply. The output side of the harmonic oscillator, which may be of conventional design, is connected to a radiator or connector 85 which is located adjacent a marginal edge of the display device in such manner that the conductive layers 77, 81 thereon form the two conductors of a transmission line, the axis of which extends along the horizontal axis of the display device. As the harmonic oscillator is energized, the radiator radiates electromagnetic waves to establish a standing wave at a position along the transmission line which is determined by the frequency of the oscillator. The harmonic oscillator may preferably include means, such as control means 87, for adjusting the frequency and amplitude of the standing wave which is thus created between the conductive layers of the display tube, and correspondingly the location of the line on the display device.

The use of a harmonic oscillator is to be preferred in most embodiments in that the oscillator distorts the sawtooth wave into an irregular and peaked wave which peak produces a potential difference between the plates in an extremely narrow region, and therefore effects the excitation of an extremely narrow point or row of points on the target. The harmonic generator may be any one of a number of well known generators which provide properly phased harmonics of an odd order.

As will be apparent to parties skilled in the art the device of FIGURE 4 is particularly well adapted (in an embodiment having a reduced "y" axis) for use as a facsimile tube which is of solid materials and provides a line scan, as desired.

With reference to FIGURE 7, there is shown an arrangement in which further focus and definition results are achieved by modifying the tube structure to constitute in effect thousands of separate diode tubes which may be individually excited to effect selective point activation of the phosphor. As there shown, the display device 90 comprises a transparent plate 91 having a conductive coating 92, a supporting core 93 for supporting a plurality of tube elements comprised of a phosphor material 94 and a semiconductor material 95, and a layer 96 which constitutes a conductive electrode for the transmission line.

The supporting core 93 comprises a plate of non-conducting plastic or glass which is honeycombed to provide a number of receiving cells for supporting the phosphor material 94 and semiconductor material 95 therewith in electrically conducting relation with layers 92 and 96. As is presently known in the art, it is possible to chemically etch a glass plate to produce thousands of holes within a small area of the glass plate. Using such a core, an electroluminescent phosphor 94 is deposited in each of the tiny holes or orifices, leaving sufficient room in each of the orifices for the latter deposition of a layer of the semiconductor material 95 therein.

The mosaic-like structure thus provided comprises a conductive supporting body having therein thousands of individually conductive orifices, each of which is comprised of electroluminescent and semiconductor material disposed in face-to-face contact with a corresponding portion of a layer of the tube. Alternatively, layer 96 may comprise one portion of the semiconductor barrier and one portion only will be located within the orifices.

As assembled in the tube, the conducting layers 92 and 96 are arranged in conducting relation with the respective sides of the supporting core 23, and in effect the assembled structure constitutes thousands of individual diode tubes, each of which is arranged to be independently and individually energized. By virtue of such construction, conduction will be limited only to those orifices which are in line with the peak of the standing wave, and a more definitive excitation of a phosphor element may be accomplished. The resistance of the phosphor or back resistance of the rectifier allows the accumulated direct current charge to bleed off.

The operation of the tube will be apparent from the description set forth hereinbefore in the matter of the tube structure of FIGURES 1, 2, 4, etc. Briefly, assuming the materials utilized as the semiconductor material are of the type in which the electron flow is in the direction indicated, conducting layer 96 will constitute the anode of the structure and is connected to ground. Conductive layer 92 in such arrangement constitutes the cathode, and a biasing potential is connected to same to normally bias the cathode positive relative to the anode, whereby the tube structure is in effect biased to cut-off.

With the establishment of a coincident wave on the transmission line comprised of layers 92 and 96 in the manner above described, the normal tube bias is overcome as before and current flow will be effected through the orifices or "diodes" of the tube which are in alignment with the vertical plane of the peak point of the wave. As a result of the current flow, the phosphor associated with the conducting diodes is excited to provide a vertical line on the screen. Ostensibly selection of any one of the "diodes" may be effected by coupling a first standing wave signal to the horizontal axis, and a second standing wave signal to the vertical axis of the conductive plates to coincide at the location of the desired diode.

A further embodiment of a novel display device which is operative with the pulse and standing wave switching techniques of the previous disclosure is set forth in FIGURE 8.

Such arrangement provides even greater definition and sensitivity through the use of a structure which adds a very small condenser in series with each light generating element of the screen. As shown in FIGURE 8, the novel display device 100 which includes a transparent glass panel 101 having a conductive layer 102 disposed in adjacent relation therewith, conducting layer 103 is disposed in superposed spaced relation with conductor plate 102, and such plate may be of a high conductive material such as, for instance, copper. A plurality of light generating elements 104 are disposed between the conductive plates, 102, 103, each of which is formed of a series of small elements deposited one on top of the other. Such construction could be efficiently effected by means of a silk screen printing process or any other similar process well-known to those skilled in the art. Thus in each element 104 a germanium or other known type of semiconductor layer or rectifier 104' which is well-known in the art is located in adjacent contacting relation with conductor plate 103. In face-to-face contact with the germanium rectifier is a section of dielectric material 106, next to which is placed a section of electroluminescent phosphor material 107. The combined element is disposed in electrical conductive relation with layer 102.

The solid state tube may be excited by coincident waves in the manner of the disclosure relating to FIGURES 1, 2, 4, etc. Additionally, since the pulses passing through the transmission line determine the size of the spot by their duration, greater definition can be achieved by making the light generating element responsive not to the entire pulse, but only to the change of voltage representing the leading edge of the pulse. The dielectric insulator material 106 of each element has high resistance and serves as a condenser to differentiate the pulse so that only the leading and trailing edge of the pulse will pass through the dielectric and cause current to flow in the electroluminescent phosphor. However, the fact that this combination has diode action means that only the front or leading edge of the pulse will actually be effective in creating current flow. The back resistance of the rectifier may serve to permit a drain-off from the combination from accumulating a charge as well as to provide a resistive element in the resistor, condensor or differentiating circuit. Since the leading edge of the pulse is much shorter than the duration of the pulse, the result is that much greater definition is achieved.

Through the use of this diode construction the specific point on the mosaic screen will only be illuminated when maximum current is passed, and this maximum current will pass only during the maximum rate of rise of the combined pulses of the transmitted waves. The duration of current at each light emitting element will be shorter and, therefore, more distinct. It will be obvious to those skilled in the art that in addition to the diode material described above, other conventional rectifying materials can be used such as those employed in the ordinary silicon rectifier. In addition, a back voltage may be impressed across such diodes so that even greater definition is achieved. In that the voltage of the transmitted pulse must exceed the back voltage before a light element can be activated, only the very sharpest peak of the pulse will be effective.

A further embodiment of a novel display device for use with the new and novel pulse and standing wave switching apparatus of FIGURES 1, 2, 4, etc., and as shown in FIGURE 9, comprises an evacuated tube 110 having a front transparent panel 111 which supports a conducting plate 112 and a phosphor target 113 in adjacent layered relation therewith, and a rear conductive panel 114 disposed in spaced relation therewith which is of a conductive material, and which includes a multitude of sharp points or dimples 115 embossed at various points thereupon. Dimples serve as high points on the back wall and provide points of field emission at high voltages.

In operation of the device, the high potential points which are established by the coincidence of the standing horizontal and vertical electromagnetic waves in the manner of the previous disclosure will cause an emission or flow of electrons between the conducting plates which form the first and second transmission lines for the electromagnetic waves. The emission will occur from the sharp points of the dimpled rear panel and will cause activation of the phosphor layer at a corresponding point on the display screen.

A further modification specifically adapted to provide a separate power source or light emission with high audio frequencies to excite the electroluminescent phosphor results in increased brightness without requiring the provision of harmonic envelopes, and as shown in FIGURE 10, the display device 120 basically comprises a first panel 121 of a transparent material, such as glass, having a conductive coating 122 on the inner surface thereof, a phosphor layer 123, a rectifier layer 124 and a transmission line 125 comprised of a pair of spaced metallic layers 126, 127 having a dielectric material 128 therebetween, the transmission line being connected to signal coupling means 131, 132 in the manner of the device of FIGURE 2 to conduct the electromagnetic waves which are coupled thereto along the horizontal and vertical axis thereof.

A particular feature of such arrangement is the manner in which the transmission line is isolated from the phosphor material, and there will be a correspondingly reduced attenuation of the exciting waves by the phosphor material. The arrangement further permits the use of metallic plates and a transmission line of increased impedance and a corresponding reduction in the power requirements is experienced. As noted heretofore, in certain others of the arrangements, the rectifier layer permits the application of a separate biasing frequency to the plate and the corresponding increase in the time duration of the signal applied to each energized point on the phosphor.

Figure 11:
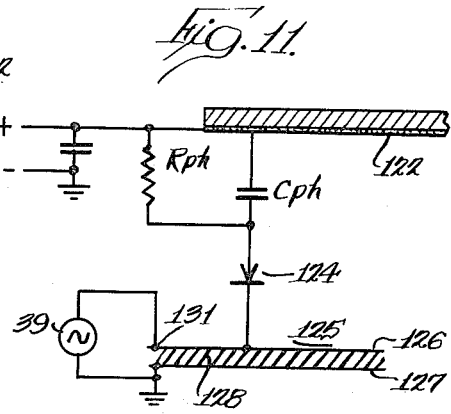

With reference to FIGURE 11, the electrical equivalent of the embodiment set forth in FIGURE 10 as it appears to the peak of a standing wave established on the horizontal axis is shown thereat. That is, as the RF oscillator 39 couples continuous wave signals to the delay line 125 a standing wave is established at a given incremental area or element of the display device which is of a value thereat to overcome the bias of the rectifier layer at such position on the transmission line. As a result the diode barrier layer 124 will conduct and electron flow will occur from delay line 125 over rectifier layer 124, phosphor layer 123 and conductive coating 122, to ground. The phosphor layer being a high capacity device absorbs a charge from the peak of the standing waves, and the rectifier layer and the phosphor in combination, maintain such charge for a length of time determined by the leakage rate thereof, whereby the energizing peak for each picture area which are of comparatively short duration are converted into an energizing potential of a sustained period sufficient to excite the picture element in an optimum manner.

Figure 12:
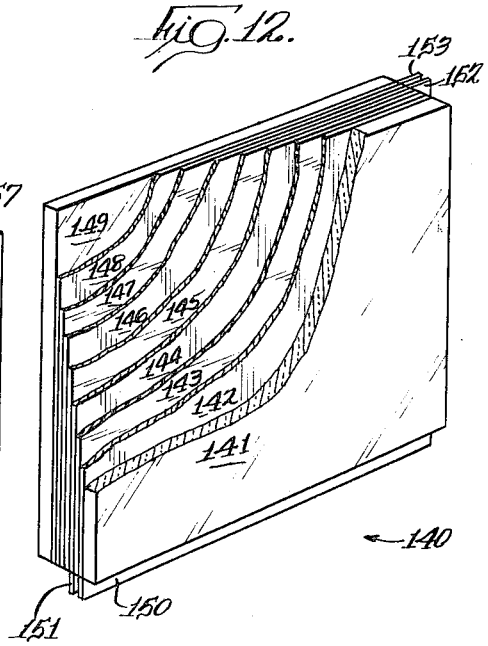

In a further embodiment which is set forth in FIGURE 12, the solid state cell provides two separate paths for establishing excitation of the phosphor which is disposed between two discrete transmission lines. As there shown, the display device 140 comprises a glass supporting panel 141, a first conductive coating or plate 142, a dielectric layer 143, a second conductive coating or plate 144, a phosphor layer 145, a third conductive coating or plate 146, a dielectric layer 147, and a fourth conductive coating or plate 148 and backing panel 149. Conductive plates 142, 144 constitute a first or horizontal transmission line for the display device, and signal coupling devices 150, 151 couple a first set of the RF waves thereto which are generated in the manner of the RF oscillator arrangement 37 of FIGURE 2 to establish a standing wave along the horizontal axis of the plates 142, 144. In a similar manner conductive coatings 146, 148 establish a second or vertical transmission line and signal coupling devices 152, 153 couple a second set of continuous waves such as are provided by the RF oscillator 39 of FIGURE 2 to the conductive coatings 146, 148 to establish a standing wave along the vertical axis of the conductive coatings 146, 148. It is apparent that the establishment of a first standing wave along the horizontal axis on the one line (142, 144) and a second standing wave along the vertical axis on the second line (146, 148) will result in the establishment of a potential difference at the point of crossover thereof and the excitation of the phosphor which lies therebetween. Manifestly the separation of the two lines maintains a discrete line of separation between the different sets of waves.

According to a further embodiment of the invention shown in FIGURE 15, a solid state lighting panel 155 is connected to a delay line 160, which is in turn connected for energization by a double pulse circuit 164 and a control circuit 165 to provide a light output of a value which is of a substantially increased value relative to the light outputs which have been experienced in previously known electroluminescent cell arrangements.

As shown in FIGURE 15, the solid state lighting panel 155 comprises an outer glass panel 156 for supporting a conductive coating or layer 157, a phosphor layer 158, a plurality of conductive strips 159, and a rear glass panel 161. The strips 159 may be of metal, or may be coated on glass panel 161, in the manner of previous embodiments, each strip 159 being spaced from or insulated relative to an adjacent strip to prevent electrical contact therebetween.

Delay line 160 may comprise a series of inductance members 162, a terminal 163 being connected between each successive pair of inductance members 162 to permit connection thereof to the successive ones of the strips 159. In a preferred embodiment, the inductance members 162 may comprise printed components supported by the glass panel 161, whereby a construction of minimum weight and expense is achieved.

Pulse circuit 164 is connected to the delay line 160 to transmit pairs of impulses along the delay line, the control circuit 165 providing a variation in the time interval between the pulses of each successive pairs to thereby adjust the coincident pulse or wave to successive positions along the line 160, and the cyclical excitation of each of the signals or strips 159 in a predetermined pattern. Since the individual panels 159 are connected to separate taps on the delay line 160, the solid state panel 155 appears to the coincident wave to have the capacity of only one section, whereby a minimum of power loss is experienced in the excitation of the display device.

A conventional RF oscillator, a ferromagnetic frequency multiplier or other similar type of device may be used to provide standing waves in the manner of the disclosure relative to FIGS. 2, 6, etc., in which event a frequency modulator would be utilized as the control circuit 165 in the adjustment of the coincident wave to successive positions. Manifestly, control circuit 166 may be adjusted to provide the selective energization of the different segments in different sequences, whereby an unusual decorative and functional effect may be achieved.

In a further embodiment of the invention, a three dimensional effect is provided by selectively energizing different points at different X, Y and Z coordinates within a given light emitting media. With reference to FIGURE 16, there is shown thereat a display tube 170 having an outer housing which may have side walls 171, 172, 173, 174 and rear wall 175 of a conventional metallic construction. The top and bottom walls 174, 172 respectively are electrically conductive and the front glass panel 176 which is transparent to permit viewing of the interior of the tube 170 has a transparent conductive coating 176' on the inner surface thereof.

A pair of vertical signal coupling members 177 determine the "X" coordinate of the point to be selected, and a pair of signal coupling members 178 determine the "Y" coordinate to be selected, the output of the signal coupling members 178 respectively being coupled to members 175, 176' to establish coincident pulses thereon in the manner of the switching techniques described heretofore. Thus, as in the structure shown in FIGURE 2, the vertical signal coupling members 177 are used to establish a coincident wave along the horizontal axis of the plates 175, 176' and the signal coupling members 178 are used to establish coincident waves along the vertical axis of the plates 175, 176'. Signal coupling member 180 establishes coincident waves on members 172, 174 to determine the "Z" coordinate of the point to be selected. The interior of the tube is filled with gas or other equivalent transparent light emitting media, and the tube is manufactured and sealed according to conventional cathode ray tube manufacturing techniques. An outer housing (not shown) may obviously be provided for protection purposes.

The operation of the device may be considered in terms of wave propagation in a wave guide or resonant cavity, the gas being effective as a light emitting media for the device. Thus as the signal coupling members 177, 178, 180 are each energized by a continuous wave generator (or a double pulse generator) of the type set forth in FIGURES 2, 5, etc., each of the signal coupling members will establish a coincident pulse at a particular line of points in its assigned plane, and the point of energization within the tube housing will be determined by the field established at the common point of intersection of the three lines of points.

As shown in FIGURE 16, the "X" coordinate of the point to be energized will be determined by the position along the "X" axis at which the coincident pulse output on conductor members 175, 176' is established by signal coupling members 177; the "Y" coordinate of the point will be determined by the position along the "Y" axis at which the coincident wave is established on conductor members 175, 176' by signal coupling members 178, and the "Z" coordinate of the point will be determined by the position along the "Z" axis at which the coincident wave is established on plates 172, 174 by signal coupling members 180.

Adjustment of the coincident waves to different positions along each of the axes will, of course, effect a corresponding adjustment of the position of the point in three dimensions, the selected circuitry for effecting such adjustment of the points being set forth in FIGURES 2, 5, etc.

While what is described is regarded to be a preferred embodiment of the invention, it will be apparent that variations, rearrangements, modifications and changes may be made therein without departing from the scope of the present invention as defined by the appended claims.

What is claimed is:

1. In a display device, an electrically conductive transmission line, signal coupling means including means for coupling at least a first set of waves to said transmission line to travel along said line and to establish a first coincident wave of increased amplitude at a position on transmission line by coincidence of the waves of said first set, means for coupling a second set of waves to said transmission line to travel along said line in a direction angularly disposed to said first set of waves to establish a second coincident wave of increased amplitude on said transmission line, and light display means disposed in electrically coupled relation with said transmission line controlled to provide a light output at a location thereon which corresponds to the position of intersection of said first and second set of waves.

2. In a display device, a planar transmission line including at least one electrically conductive plate, signal coupling means including means for coupling at least a first wave to said planar line for travel along said one plate at least, and a second wave to said planar line for travel along said one plate at least to intersect at a position along the length of said one plate, at least, and to establish a coincident wave of increased amplitude at the position of intersection, and light display continuum means electrically coupled to said planar line controlled to provide a light output at a position along a dimension thereof which corresponds to the position of occurrence of said planar coincident wave on said planar line.

3. In a display device as set forth in claim 2 in which said signal coupling means includes means for providing continuous waves for coupling to said planar transmission line, and harmonic generator means for providing harmonics for said continuous waves.

4. An electronic display device including a transmission line comprising a first electrically conductive member and a second conductive sheet-like member disposed in adjacent spaced relation to mutually conduct an applied signal along successive segments of said members in the manner of a transmission line, a material electrically coupled to said first and second members capable of emitting light responsive to the occurrence of current flow between at least one predetermined segment of said members, and means for coupling at least a first wavefront and a second wavefront to said transmission line for travel along successive segments of said members in the manner of the travel of signals along a transmission line, including means for adjusting the relative time of coupling of said first and second wavefronts to said members to a value which effects coincidence of said first and second wavefronts at said predetermined segment, and thereby a coincident wave which establishes current flow between said segment of said members and light emission by only a corresponding segment of the light emitting material.

5. A display device as set forth in claim 4 in which one of said sheet-like members includes a plurality of sharp projections on one surface thereof, and said means for coupling the wave fronts to said transmission line are operative to establish a current conducting path which extends over said conductor members including one of said projections and a corresponding point on said light-emitting material.

6. In a display device, a transmission line comprised of at least a first and a second electrical conductor member, signal coupling means including means for coupling at least a first and a second wave to said first and said second conductor members of said transmission line, said second wave being coupled to the conductor members of said line at a predetermined relative time to control same to intersect said first wave on said line at a predetermined position thereon; a light emitting member disposed in electrically coupled relation with at least one of said conductor members controlled thereby to luminesce at a predetermined position by the increased potential which occurs at the position of intersection of at least said first and second waves on said line, movement of said position of intersection effecting corresponding movement of the position of luminescence, and means operative to vary the value of the potential difference established between the first and second conductor members by the intersecting waves to vary the light output of the light emitting member.

7. In a display device, a transmission line comprised of at least a first and a second electrical conductor member, signal coupling means including means for coupling at least a first wave to the first and second conductor members of said line, and a second wave to the first and second conductor members of said line, said second wave being timed to intersect said first wave in an additive manner on said line to provide a resultant third wave at the position of intersection on said conductor members, a luminescent screen electrically coupled to said conductor members, and means for selecting only a predetermined portion of the resultant third wave to activate a portion of said screen which corresponds to the position of intersection of said first and second waves on said line.

8. An electronic display device including a transmission line comprised of a first and a second electrical conductor sheet-like member, display media electrically connected to said first and second conductor members comprising a light emitting material capable of emitting light responsive to the application of an electromagnetic wave of a given value thereto, rectifier means electrically connected to said material and said conductor means including means for applying a biasing potential to said rectifier means to normally prevent current flow over said rectifier means and the display material, and signal means for transmitting at least a first and a second set of waves along both of said conductor members to coincide at the point of connection of said rectifier means, the wave resulting from said coincidence being of a value sufficient to overcome said biasing potential for said rectifier means to thereby establish current flow over said rectifier means and the display material, and the excitation of the display material at a point which corresponds to the point of coincidence of said waves.

9. An electrical display device as set forth in claim 8 in which said rectifier means comprises a plurality of independent separate rectifier segments disposed in adjacent relation with said light-emitting material, and in spaced electrically independent relation with each other, and in which said signal means is operative to couple a first and second set of waves to coincide on said conductor members selectively adjacent a desired one of said rectifier cells to activate such cell and a corresponding point on said light-emitting material.

10. In a display device, a transmission line comprised of at least a first and a second electrical conductor sheet-like member having a mismatched terminating end, signal coupling means disposed adjacent an opposite end of said transmission line including pulse generator means for generating at least a first and a second impulse at a timed interval, means for coupling said first and said second impulses to the opposite end of said line in said timed relation, whereby said first pulse travels the length of the conductor members and is reflected back along the conductor members to intersect said second pulse in its advance therealong and to provide a coincident impulse of increased amplitude at the interesection of the impulses, and display means electrically coupled to at least one of said conductor members controlled to provide a light output at a position therealong which corresponds to the position of the coincident impulse on said line.

11. An electronic display device comprising a transmission line including a first and a second electrically conductive plate having a sheet-like structure disposed in spaced relation in the manner of a transmission line having a mismatched terminating end, a light emitting material disposed between a substantial portion of the coextensive sections of said plates capable of emitting light responsive to current flow between said plates, and radio-frequency signal generator means operative to couple radio frequency signals to a point on said plates removed from said terminating end for travel along said plates in the manner of a transmission line to establish a standing wave on said line at a preselected distance from said point of application of said signals to said plates as determined by the frequency rate of said signals, said standing wave being a value to establish current flow between said plates to excite said light-emitting material at a segment thereof which corresponds to the location of said standing wave on said line.

12. In a display device, a transmission line comprised of at least a first conductor means having a sheet-like structure and a second conductor means having a sheet-like structure, signal coupling means including a radio frequency oscillator for coupling continuous waves to said conductor members for travel along the first and second conductor member and in a direction of an axis of the conductor members to establish a standing wave at a given position along said first and second means, and a light emitting screen having a sheet-like structure electrically coupled to said conductor members controlled to luminesce at a position thereon which corresponds to the position of occurrence of said standing wave on said conductor members.

13. In a display device, a transmission line comprised of at least a first and a second electrical conductor member, signal coupling means including means for coupling at least a first wave to said first and second conductor members for travel along said first and said second conductor members in the direction of one of the axes of the conductor members, and means for coupling at least a second wave to said first and second conductor members for travel in a direction which is angularly displaced relative to said first wave to thereby effect intersection of the first and second waves, means for varying the time of transmission of said second wave relative to the time of transmission of said first wave to effect intersection of the waves at correspondingly different positions on said line, and light emitting means having at least a horizontal and vertical dimension electrically coupled to said conductor members controlled to luminesce at a point thereon which corresponds to the position of occurrence of the increased amplitude wave on said conductor member waves.

14. In a display device, a transmission line comprised of at least a first and a second electrical conductor plate member disposed in juxtaposed relation, signal coupling means including at least a first means disposed adjacent one corner of said plate members to radiate a first impulse substantially along a first diagonal of said plates, and a second means disposed adjacent a second corner of said plates for radiating a second impulse substantially along a second diagonal of said plates to intersect said first pulse and provide a third pulse of increased amplitude thereat, means for varying the time of generation of said first impulse to effect intersection of the first and second impulses at correspondingly different points on said transmission line, and a light emitting media disposed in electrically coupled relation with said conductor members controlled to emit light at a given position which corresponds to the position of occurrence of the increased amplitude pulse on said line.

15. In a display device, a transmission line comprised of at least a first and a second electrical conductor member, signal coupling means, means for applying a first wave to said signal coupling means for transmission over said first and said second conductor members of said transmission line, said line being connected to reflect said wave for travel back over said first and said second conductor members of said transmission line in an opposite direction, and for applying a second wave to said signal coupling means for transmission over said line to intersect the reflected portion of said first wave on said line and to provide a third wave of increased amplitude thereat; and a light emitting continuum disposed in electrically coupled relation with said transmission line controlled to luminesce at a position thereon which corresponds to the position of occurrence of the third wave on said line.

16. An arrangement as set forth in claim 15 which includes means for varying the time interval between transmission of the first wave and the second wave to thereby effect the emission of light at correspondingly different positions on said continuum.

17. In a display device, a transmission line comprised of at least a first and a second two-dimensional conductor member, signal coupling means including means for coupling at least a first wave and a second wave to said first and second conductor members to travel along said line and to intersect at a position thereon, means for coupling at least a third and a fourth wave to said first and second conductor members to travel along the line in a direction angularly disposed to said first and second waves, and to intersect therealong, the four waves being coincident at a predetermined point on said conductor members to provide a coincident wave of increased amplitude thereat, and light emitting means electrically coupled to said conductor members controlled to emit light by the wave of increased amplitude which occurs at the position of coincidence of the four waves on said first and second conductor members.

18. An arrangement as set forth in claim 17 which includes control means comprising a first timing means for varying the time interval between transmission of the first and second waves; a second timing means for varying the time interval between transmission of the third and fourth waves, and means for varying the time of transmission of the third and fourth waves relative to the time of transmission of the first and second waves to thereby vary the position of intersection of the four waves on the line.

19. An arrangement as set forth in claim 18 which includes means for connecting said control means to the sweep circuits of a television receiver for control thereby in the excitation of successive points on the light emitting means in the manner of a raster scan, and means for modulating the successive points of the raster scan to effect reproduction on the light emitting means of the information represented by the video signals incoming to the television receiver.

20. In a display device, a transmission line comprised of at least a first and a second electrical conductor member, a first signal coupling means including means for applying a first wave to said first signal coupling means for application to said transmission line over a path in a first direction, reflection means for effecting reflection of said wave back over said path, and means for applying a second wave to said signal coupling means for transmission over said path to intercept the reflected portion of said first wave on said path; a second signal coupling means, means for applying a third wave to said second signal coupling means for coupling along a second path in a direction angularly disposed relative to said first path, reflection means for reflecting said third wave back over said second path, means for applying a fourth wave to said second signal coupling means for coupling to said second path to intercept the reflected portion of said third wave on said path, and a luminescent screen electrically coupled to said conductor members controlled to luminesce by the increased amplitude pulse which occurs between the conductor members at the position of intersection of the four waves on the line.

21. In a display device, a transmission line comprised of at least a first and a second electrical conductor member having at least a first and a second axis disposed in angular relation to each other, signal coupling means including means for coupling at least a first wave to said first and second conductor members for travel along the first axis in one direction, and means for coupling a second wave to said first and second conductor members to travel along said first axis in a direction opposite to said first wave; means for coupling a third wave to said first and second conductor members for travel along said second axis in a given direction which is angularly disposed relative to said first axis, and means for coupling a fourth wave to said first and second conductor for travel along said second axis in a direction opposite to said third wave to intersect the same, and a luminescent media disposed adjacent said conductor members controlled to luminesce at a position corresponding to the position of coincidence of said four waves on said first and second conductor members.

22. An electroluminescent display device comprising a first conductor sheet-like member and a second electrical conductor member disposed in the manner of a transmission line, rectifier means electrically coupled to said members for establishing a normal barrier to current flow across said members in one direction, and means for impressing a biasing potential across said members to prevent the flow of current therebetween in the other direction; display media electrically coupled to said first and second conductor members, and means for coupling a plurality of waves to said members for travel therealong to selectively establish a standing wave at different positions along said members which are of a potential value which is greater than the biasing potential existing between said members to thereby establish current flow between the members at the selected one of the positions and the excitation of the portion of the display media which is electrically coupled thereto.

23. An electronic display device including a transmission line comprising a first sheet-like electrically conductive member and a second sheet-like electrically conductive member disposed in adjacent relation to mutually conduct applied signals along successive segments of the members in a given direction in the manner of a transmission line, means for providing a mismatched terminating end on said members for the signals which are transmitted in said one direction, a material electrically coupled to and extending for a substantial part of said first and second members capable of emitting light responsive to the occurrence of current flow between at least one predetermined segment of said members, and signal means for coupling signals to said transmission line for propagation along successive segments of said line in said given direction, including means for adjusting the wave length of said signals to selectively establish a standing wave to establish a current flow at only said predetermined segment, and thereby a current flow between said plates at said segment and light emission by only a corresponding segment of the light emitting material.

24. An electronic display device including a planar transmission line comprising a first electrically conductive plate member and a second electrically conductive plate member disposed in adjacent spaced relation to mutually conduct an applied signal along successive segments of the members in a plane thereof, a display material electrically coupled to said first and second electrically conductive plate members capable of emitting light responsive to the occurrence of current flow between at least one predetermined segment of said members, means for coupling continuous waves to said transmission line to establish a coincident wave at different predetermined segments thereon which are of a value to establish current flow between the members thereat, and electrically conducting line-extension means connected to the terminating end of said members relative to the direction of travel of said waves to provide a line having an electrical length which is greater than the display area for the device.

25. A display device for providing visual presentations responsive to the controlled transmission of electromagnetic waves thereover comprised of a transmission line including at least a first and a second electrical conductive quadrilateral plate member disposed in superposed spaced relation, at least one of which is at least partially translucent, an electromagnetic wave responsive material disposed between said quadrilateral conductive plate members which emits light responsive to the coupling of a potential thereacross electrically coupled to said conductive plate members, and signal coupling means for coupling electromagnetic waves to said conductive plate members for travel along a plane thereof in the manner of a transmission line comprising at least one signal coupling member disposed adjacent one marginal edge of both of said plate conductive members, and at least a second signal coupling member disposed along a second marginal edge of both of said plate conductive members, whereby the signal output of each of said signal coupling members is coupled to both of said conductive members for transmission therealong in directions which are angularly disposed to each other.

26. A display device for providing visual presentations responsive to the controlled transmission of electromagnetic waves thereover comprised of a luminescent screen layer, a pair of plate conductor members disposed in layered relation with and electrically coupled to said screen layer, and signal coupling means disposed in wave coupling relation with said plate conductor members comprising at least one signal coupling member disposed adjacent one marginal edge of said plate conductor members for coupling an electromagnetic wave to at least one plate conductor member of said pair, and at least a second signal coupling member disposed along a second opposed marginal edge of said plate conductor members to couple a second electromagnetic wave to at least said one conductor member of said pair to intersect with said first wave.

27. A display device for providing visual presentations responsive to the controlled transmission of electromagnetic waves thereover comprised of a layer of light emitting material, a rectifier layer, and a pair of plate conductor members disposed in layered relation therewith, and signal coupling means for applying electromagnetic waves to said plate conductor members for travel along a plane thereof in the manner of a transmission line to effect the coincidence of a plurality of waves at a position on the line, and the excitation of the light emitting layer thereat, comprising at least one signal coupling member disposed adjacent a first edge of said plate conductor members for coupling a first set of waves to at least one of the plate conductor members for travel in a first direction, and at least a second signal coupling member disposed along a second edge of said plate conductor members for coupling a second set of waves to at least said one of the conductor members for travel in a second direction which is angularly disposed to said first direction.

28. A display device for providing visual presentations responsive to the controlled transmission of electromagnetic waves thereover comprised of at least a layer of light emitting material, a dielectric layer and a pair of electrically conductive layers disposed in juxtaposed relation, and signal coupling means for applying electromagnetic waves to said conductive layers for travel along a plane thereof in the manner of a transmission line to a point of intersection thereon to effect the excitation of a corresponding portion of the light emitting material, thereat.

29. A display device for providing visual presentations responsive to the controlled transmission of electromagnetic waves thereover comprised of at least a layer of light emitting material, a resistance layer and a pair of electrically conductive layers disposed in juxtaposed, electrically conducting relation, and signal coupling means for applying electromagnetic waves to said conductive layers for travel along said conductive layers in the manner of a transmission line to a position of coincidence thereon comprising at least one signal coupling member disposed adjacent one marginal edge of said conductor members to provide a first wave for travel along said conductive layers, and at least a second signal coupling member disposed adjacent to a second opposed marginal edge of said conductor members to provide a second wave for travel along said layers into coincidence with said first wave.

30. A display device for providing visual presentations responsive to the controlled transmission of electromagnetic waves thereover comprised of a first layer of light emitting material, a second layer of a material characterized by its ability to slow the velocity of wave propagation, and a transmission line comprising a pair of spaced conducting members disposed in electrically coupled and juxtaposed relation with said first and second layer, and signal coupling means for applying electromagnetic waves to said transmission line for intersection at a position thereon and the establishment of a potential difference across a section of said transmission line which is sufficient to excite said light emitting material thereat.

31. In an electronic display device, a front plate capable of conducting an electric current, a perforated block of non-conducting material disposed adjacent said front plate, electroluminescent material disposed in each of the perforations of said block, a predetermined material deposited in said perforations in intimate contact with said electroluminescent material, and a back conductive plate disposed in electrical contact with said predetermined material, said predetermined material and said back conductive plate consisting of material which permit only unilateral conductivity at their junctions.

32. In an electronic display device a segment comprised of electrical conducting material, a second segment comprised of electroluminescent phosphor material, a perforated block of non-conducting material disposed adjacent said electroluminescent segment, a predetermined material deposited in said perforations in intimate contact with said electroluminescent material and a second conductive segment in electrical contact with said predetermined material, said predetermined material and said second conductive segment consisting of materials which permit only unilateral conductivity at their junctions.

33. In an electronic display device, a pair of electrically conducting plates, a core of non-conductive material disposed between said plates, a multitude of orifices extending through said core into registration with each of said plates, electroluminescent material deposited in a portion of each of said orifices adjacent one of said plates, and a predetermined material deposited in the remaining portion of each of said orifices in contacting relation with said electroluminescent material and said other plate to prevent current conduction thereover in one direction, means for applying a bias to said plates to normally prevent current conduction in the other direction, and means for applying bias overcoming signals to said plate to selectively overcome said bias for at least one of the cells established by said orifices to thereby excite the electroluminescent material therein.

34. An electroluminescent display device for providing a presentation of signals thereon comprising electroluminescent target means, a plurality of rectifier segments, each of which is disposed adjacent a different preassigned segment of said target means to prevent current flow thereover in one direction and to permit current flow thereover in the other direction, and signal coupling means including transmission line means including a first and second conductor member disposed adjacent at least one of said rectifier segments, generator means for applying a first wave and a second wave to both said first and second conductor member to establish a standing wave selectively across said first and second conductor members and only the one of said rectifier segments located thereat which is of a value to effect current flow thereacross in said other direction to thereby effect activation of only the portion of said target means adjacent thereto.

35. An electromagnetic display device having a display area comprising first and second sheet-like conductive members arranged in adjacent layered substantially coextensive relation with the entire display area of the device including a rectifier set having at least one element operative to permit current conductivity in one direction and to prevent current conductivity in the other direction, means for applying a biasing voltage to said elements of said device to normally prevent current flow in said one direction, and a sheet-like target means located for excitation by such current flow as is permitted by said element responsive to the application of overcoming signals across the biased section, said first and second sheet-like conductor members having a surface substantially coextensive with the display area of said target means.

36. In an electronic display device, a first plate member of a conductive material, a layer of light-emitting material disposed adjacent said conductive plate member to provide the display area for said device, a rectifier layer including at least one sheet-like conductive member disposed adjacent said electroluminescent material extending substantially coextensively with the entire display area for said device, means for applying a biasing potential across the first and second plate-like conductive members including the rectifier layer to normally prevent current conduction between said members, and means for applying a first signal to said first and second conductive members, and a second signal to said first and second conductive members to coincide with said first signal on said first and second conductive members to establish a coincident pulse at one coordinate point, at least, on said members to establish a unidirectional current flow between said members and activation of said electroluminescent material at the points of current flow.

37. An electronic display device as set forth in claim 36 in which said means for applying a bias overcoming signal to said plates includes generator means for establishing a standing wave between said plates which is of a peak value, at one point at least, to overcome said bias.

38. An electronic display device comprising a perforated conductive plate, a plurality of envelopes disposed in the perforations of said plate, a second conductive plate in contact with one end of said envelopes, a section including a light emitting material and rectifier means disposed within said envelopes and a conductive member disposed in contact with the other ends of said envelopes.

39. A display device for use in the presentation of visual displays responsive to the application of electromagnetic impulses thereto comprising a continuous display area for said device comprising a continuous sheet of luminescent material, a pair of electrically conductive plate members, a rectifier layer, and a dielectric layer member disposed in juxtaposed relation between said pair of electrically conductive plate members said rectifier layer, said dielectric layer and said electrically conductive plate members being continuous sheets which extend coextensively with the display area of said device.

40. In an electronic display device, a front plate member capable of conducting an electric current, a perforated block of nonconducting material disposed adjacent said front plate, light emitting material disposed in each of the perforations of said block, a rectifier material deposited in said perforations in intimate contact with said electroluminescent material, and a back conductive plate disposed in electrical contact with said rectifier material.

41. In a display system for use with a control unit having a horizontal sweep output, a transmission line including at least a first and a second electrical conductor member, wave generator means, signal coupling means for coupling sets of waves to the conductor members of said transmission line to establish a coincident wave thereon which is of a correspondingly increased amplitude at a position on said line, light emitting means electrically coupled to said conductor members controlled to emit light in response to the variance of the increased amplitude coincident wave at a segment thereof which corresponds to the position of occurrence of the coincident wave on said line; frequency modulator means connected to the horizontal sweep output of the control unit, and output means for said frequency modulator means connected to said wave generator means to adjust the position of the coincident wave to different places along the length of the line in accordance with the nature of the horizontal sweep signals which are coupled to the frequency modulator means by the control unit.

42. In a display system for use with a television receiver having horizontal and vertical sweep outputs, a transmission line including at least a first and a second bi-dimensional conductor member, signal means including a first wave generator means and signal coupling means for coupling sets of waves from said first generator means to the conductor members for travel along one dimension thereof to establish a coincident wave thereon which is of an increased amplitude at the position of coincidence, and a second wave generator means, and signal coupling means for coupling sets of waves from said second generator means for travel along a second different dimension thereof to establish a coincident wave thereon, light emitting means electrically coupled to said conductor members controlled to emit light at a position thereon which corresponds to the position of occurrence of the first and second coincident waves; frequency modulator means connected to the horizontal and vertical sweep output of the television receiver, and output means for said frequency modulator means connected to said first and second wave generator means to control same to adjust the position of the coincident wave to different places along the length of the line in accordance with the nature of the sweep signals which are coupled to the frequency modulator means by the television receiver.

43. A display device for providing visual presentations responsive to the control transmission of electromagnetic waves thereover comprised of a first set of electrically conductive members disposed in juxtaposed relation, a light emitting display media disposed in electrically conducting relation therewith, signal coupling means for applying electromagnetic waves to said conductive members for travel along a plane thereof in the manner of a transmission line to selectively energize a point on said light emitting media at a predetermined "X" and "Y" coordinate thereon, and a second set of conductive members operative to adjust said point along a "Z" axis in said light emitting display media.

44. In a display device, a substantially planar transmission delay line, signal coupling means including means for coupling at least a first set of waves to said transmission line to travel along said line and to establish a first coincident wave of increased amplitude at a position on said transmission line, means for coupling a second set of waves to said transmission line to travel along said line in a direction angularly disposed to said first set of waves to establish a second coincident wave of increased amplitude on said transmission line, and light display means disposed in electrically coupled relation with said transmission line controlled to provide a light output at a location thereon which corresponds to the position of intersection of said first and second coincident waves.

45. In a display device, a transmission line including first and second sheet-like members and means for coupling at least a first wave to said line for transmission along the line in a given direction, and a second wave for travel along said line to coincide with said first wave during a period of travel of the two waves on said line in which the waves are approaching each other from opposed directions, light display means electrically coupled to said at least one of said sheet-like means, and means for coupling at least one additional wave to said line to provide a light output at the point of coincidence of at least said additional wave with said first and second waves.

46. In a display device, a planar transmission line comprised of a plurality of plate members, at least one of which plate members has the ability to propagate waves, signal means for initiating travel of a first wave along at least said one plate member and a second wave along at least said one plate member to intersect with said first wave at a position on said one plate member and to provide a coincident wave of increased amplitude along a line of points on said plate member, light-emitting means disposed in coupled relation with said one plate member, and means including said plate members for selectively controlling said light-emitting means to emit light at one of the points determined by the position of intersection of at least said first and second waves on said one plate member.

47. In a display device, a planar transmission line comprised of a plurality of plate members, at least one of which has wave propagating properties, signal means for establishing travel of a first wave along at least said one plate member and a second wave along at least said one plate member to intersect with said first wave along a line of points on said plate member, light-emitting means coupled to said one plate member, means for selectively controlling said light-emitting means to emit light at one of the points determined by the position of intersection of said first and second waves on said one plate member, and modulation means for varying the amount of light output produced at said one point.

48. In a display device, a plurality of plate members disposed in superposed layered relation to provide a planar transmission line having a quadrilateral shape, signal means for establishing travel of a first wave along at least said one plate member and a second wave along at least said one plate member to intersect with said first wave at a position on said line, said first and second wave providing a pulse of increased potential at said position of intersection, means for varying the time of initiation of travel of said second wave on said line relative to the time of travel initiation of said first wave on said line to effect intersection of the waves at correspondingly different positions on said line, electroluminescent means comprising electroluminescent material disposed in layered and coupled relation with at least said one plate member, means including said plate members for selectively controlling said electroluminescent material to emit light at one point on the position of intersection of said first and second waves on said plate member, and threshold means operative to substantially prevent excitation of said electroluminescent material by said first and second waves alone in travel.

49. In a display device, a plurality of plate members disposed in superposed layered relation to provide a planar transmission line having a quadrilateral outline, signal means for propagating a first wave at one marginal edge of said line for travel from said edge along at least one dimension of one of said plate members toward an opposite edge of said line, signal means for establishing a second wave at said opposite marginal edge of said line for travel along at least said one dimension of said plate member in the opposite direction to intersect with said first wave at a position on said line and to provide a coincident wave of increased amplitude thereat, means for varying the time of establishment of said second wave at said opposite marginal edge relative to the time of establishment of said first wave at said one marginal edge to effect intersection of the waves at correspondingly different positions on said line, light-emitting means coupled to at least said one plate member, and means for selectively effecting current conduction over said light-emitting means at one of the points determined by the position of intersection of said first and second waves on said one plate member.

50. In a display device, a planar transmission line comprised of a plurality of plate members disposed in layered superposed relation, wave propagation means for establishing travel of at least a first wave and a second wave on at least one of said plate members of said line to intersect on said plate member, means for establishing travel and intersection of at least a third and a fourth wave along one plate member in a direction angularly disposed to said first and second waves, coincidence of said four waves at a predetermined point on said line providing a coincident wave of increased amplitude, and means coupled to said line controlled by said waves at said point of coincidence of the four waves on said plate member to provide a light output.

51. In a display device, a transmission line comprised of at least first and second plate members having first and second dimensions, a first wave propagation means disposed adjacent at least one marginal edge of said plates for propagating at least a first wave for travel along said first dimension of at least one of said plate members of said line, a second wave propagating means disposed at an opposing marginal edge of said plate member for propagating a second wave for travel along said first dimension of at least said one plate member to intersect with said first wave at a position on said line, a third wave propagating means disposed adjacent at least one marginal edge perpendicular to said first edge for transmitting at least a third wave along said second dimension of said one plate member in a direction angularly disposed to said first and second waves, a fourth wave propagating means adjacent said remaining marginal edge for propagating a fourth wave along said second dimension of at least said one plate member to intersect with said other waves, four waves being coincident at a predetermined point on said line to provide a coincident wave of increased amplitude thereat, and light emitting means coupled to at least said one plate member controlled to emit light by the wave of increased amplitude which occurs at the position of coincidence of the four waves.

52. In a display device, a planar transmission line having first and second angularly disposed dimensions along which waves are propagated comprising means for establishing travel of at least a first wave and a second wave along said first dimension of said line to intersect at a position on said line, means for establishing travel of at least a third and a fourth wave for travel along said second dimension on said line for intersection with each other, said four waves being coincident at a predetermined point on said line to provide a coincident wave of increased amplitude thereat, and means coupled to said line for providing a light output at said point of intersection of said four waves.

53. A method of selectively exciting different points of a light-emitting means coupled to a planar transmission line having a first and a second dimension angularly disposed to each other comprising the steps of propagating a first wave along said first dimension of said line, propagating a second wave along said first dimension of said line to meet with said first wave, propagating a third wave along said second dimension of said line which is angularly disposed to said first dimension and the direction of travel of said first and second waves, and propagating a fourth wave for travel along said second dimension of said line to coincide with said first, second and third wave at a point to provide a coincident wave which is of an amplitude to establish current flow over said light-emitting means at said point.

54. A method of providing a visual display on a display device comprising a planar transmission line including at least one plate member having light-emitting means coupled thereto for selective energization comprising the steps of propagating a first wave along one dimension of said plate member, propagating a second wave along the same dimension of said member to meet with said first wave, propagating a third wave along a dimension of said member angularly disposed to said first dimension and the direction of travel of said first and second waves, and propagating a fourth wave for travel along said second dimension of said member to coincide with said first, second and third wave at a point to provide a coincident wave which is of an amplitude to energize said light-emitting means at the point of intersection of said four waves.

References Cited by the Examiner
UNITED STATES PATENTS

| | | | |
|---|---|---|---|
| 1,824,572 | 9/1931 | Roberts | 315—323 X |
| 2,248,604 | 7/1941 | Boersch | 333—82 |
| 2,792,493 | 5/1957 | Duckett | 333—11 |
| 2,818,531 | 12/1957 | Peek | 315—169 |
| 2,851,634 | 9/1958 | Kazan | 315—169 |
| 2,859,385 | 11/1958 | Bentley | 315—169 |
| 2,886,731 | 5/1959 | Zappacosta | 313—108 |
| 2,888,582 | 5/1959 | Hanlet | 315—169 |

DAVID J. GALVIN, *Primary Examiner.*

RALPH G. NILSON, *Examiner.*